US012762583B2

(12) United States Patent
Terborg et al.

(10) Patent No.: US 12,762,583 B2
(45) Date of Patent: Oct. 13, 2026

(54) ADAPTIVE ADVERSARIAL SYSTEM TO STRUCTURE COMPETING INTERESTS

(71) Applicant: PlayStudios US, LLC, Las Vegas, NV (US)

(72) Inventors: Heinrich Fidencio Terborg, Mexico City (MX); Peter Kendall Landi, Las Vegas, NV (US); Shih-Chien Lee, Belmont, CA (US)

(73) Assignee: PLAYSTUDIOS US, LLC, Las Vegas, NV (US)

( * ) Notice: Subject to any disclaimer, the term of this patent is extended or adjusted under 35 U.S.C. 154(b) by 100 days.

(21) Appl. No.: 18/744,456

(22) Filed: Jun. 14, 2024

(65) Prior Publication Data

US 2024/0420223 A1 Dec. 19, 2024

Related U.S. Application Data

(60) Provisional application No. 63/521,162, filed on Jun. 15, 2023.

(51) Int. Cl.
*G06Q 30/0201* (2023.01)
*G06N 3/092* (2023.01)
*G06N 3/094* (2023.01)

(52) U.S. Cl.
CPC ....... *G06Q 30/02017* (2025.08); *G06N 3/092* (2023.01); *G06N 3/094* (2023.01); *G06Q 30/020141* (2025.08); *G06Q 30/0206* (2013.01)

(58) Field of Classification Search
CPC ..... G06Q 30/02017; G06Q 30/020141; G06Q 30/0206; G06Q 30/0605; G06Q 30/0633;
(Continued)

(56) References Cited

U.S. PATENT DOCUMENTS 7,166,791 B2 * 1/2007 Robbin ................. G06F 3/0482
84/600
8,612,888 B2 * 12/2013 Pennington ......... G06F 3/04855
715/764
(Continued)

FOREIGN PATENT DOCUMENTS

WO WO-03029917 A2 * 4/2003 ............. H04L 67/62
WO WO-2009134432 A1 * 11/2009 ......... G06F 16/9535
WO WO-2011119488 A2 * 9/2011 ........... G06F 3/0426

OTHER PUBLICATIONS

Michael "Balancing competing interests in information products: A conceptual rethink", Aug. 2006, Information & Communications Technology Law , pp. 1-3 (Year: 2006).*
(Continued)

*Primary Examiner* — Romain Jeanty
(74) *Attorney, Agent, or Firm* — Fenwick & West LLP

(57) ABSTRACT

Data describing how multiple users interact with an online system is gathered. Macro-level data is extracted from the collected data that is associated with overall trends of products offered by the online system. A machine learning model is trained using the macro-level data to receive features of a product as input to generate a supply-demand curve of the product. The machine learning model is applied to multiple products to generate a supply-demand curve for each product. Placements of at least a subset of products are determined based on the supply-demand curves of the products. A user's interaction with at least one product is predicted, upon the placements of the subset of products being presented to the user. The adjusted placements of the subset of products are presented to the user on a graphical user interface.

20 Claims, 12 Drawing Sheets

(58) Field of Classification Search
CPC ........... G06Q 30/0639; G06Q 30/0641; G06N 3/092; G06N 3/094; G06N 20/00
USPC ........................................................ 705/3.44
See application file for complete search history.

(56) References Cited

U.S. PATENT DOCUMENTS

| | | | | |
|---|---|---|---|---|
| 10,645,159 | B1 * | 5/2020 | Chen | H04L 67/02 |
| 11,245,951 | B2 * | 2/2022 | Lim | G06F 3/0481 |
| 11,792,483 | B2 * | 10/2023 | Ganschow | G06F 3/0482 725/37 |
| 2007/0027869 | A1 * | 2/2007 | Collins | G06F 16/951 |
| 2008/0178125 | A1 * | 7/2008 | Elsbree | G06F 3/0482 715/862 |
| 2012/0030623 | A1 * | 2/2012 | Hoellwarth | G06F 3/04817 715/811 |
| 2015/0278837 | A1 | 10/2015 | Lahav et al. | |
| 2018/0212890 | A1 * | 7/2018 | Yan | H04L 67/535 |
| 2018/0260840 | A1 * | 9/2018 | Jeon | G06N 20/00 |
| 2019/0108556 | A1 * | 4/2019 | Maher | G06Q 30/0273 |
| 2020/0265463 | A1 * | 8/2020 | Goldman | G06Q 30/0245 |
| 2021/0073858 | A1 * | 3/2021 | Sokolov | G06Q 30/0255 |
| 2022/0377424 | A1 | 11/2022 | Deng et al. | |
| 2023/0206265 | A1 | 6/2023 | Girija et al. | |

OTHER PUBLICATIONS

Tuomas et al "Optimal Clearing of Supply/Demand Curves", Dec. 2002, American Association for Artificial Intelli gence, pp. 1-8 (Year: 2002).*

PCT International Search Report and Written Opinion, PCT Application No. PCT/US24/34201, Sep. 11, 2024, 22 pages.

United States Office Action, U.S. Appl. No. 18/744,464, filed Feb. 6, 2026, 26 pages.

* cited by examiner

ADAPTIVE ADVERSARIAL SYSTEM TO STRUCTURE COMPETING INTERESTS

CROSS-REFERENCE TO RELATED APPLICATION

This application claims the benefit of U.S. Provisional Application No. 63/521,162, filed Jun. 15, 2023, which is incorporated by reference in its entirety.

TECHNICAL FIELD

This disclosure generally relates to an adversarial system that balances different entities' interests in an online environment, and, more specifically, to using machine learning to adaptively train an adversarial system for balancing competing interests of providers and users.

BACKGROUND

Incentivized engagement systems are designed to reward users for their participation and interaction, fostering ongoing engagement by offering tangible or intangible benefits. These systems are prevalent across various domains, such as gaming systems, mobile applications, digital marketing platforms, and cryptocurrency-based platforms.

For example, some online multiplayer games may use a battle pass system, where players can complete specific challenges to earn rewards such as skins, emotes, and more. Players can purchase the battle pass to access premium rewards.

As another example, an educational mobile application may use gamification to encourage consistent practice. Users can earn points, badges, and levels as they progress through lessons, motivating them to continue learning. Similarly, a fitness mobile application may incentivize users by offering badges and challenges. Users can compete against others and earn achievements based on their physical activities.

Additionally, some blockchain-based games allow players to earn cryptocurrency by breeding, raising, and battling fantasy creatures. Some decentralized social media platforms may allow users to earn cryptocurrency for publishing and curating content. It rewards users for their contributions, thereby motivating quality content creation and engagement.

However, such incentivized engagement systems face challenges of harmonizing divergent interests of providers and users within open and dynamic online environments.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure 1:
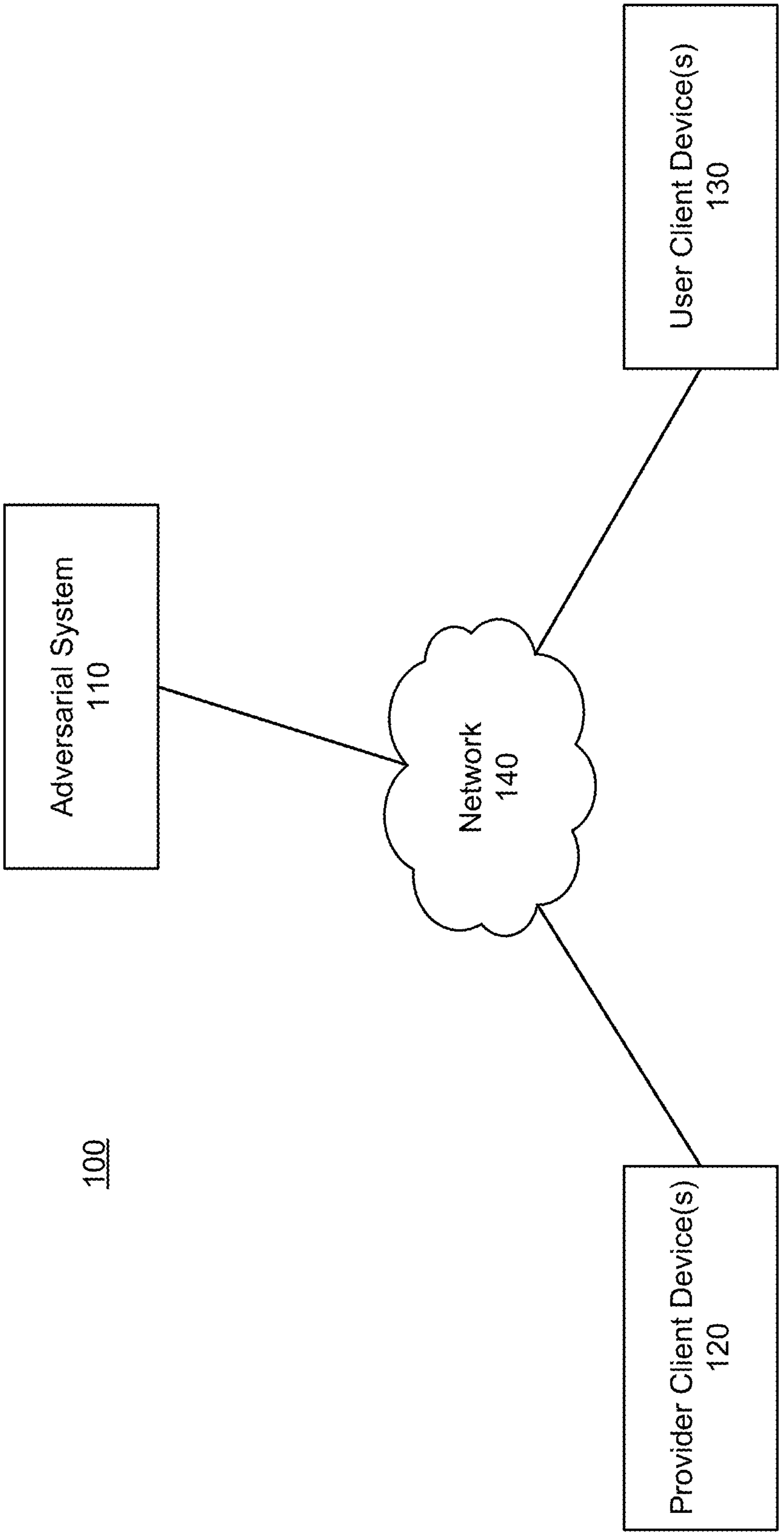
FIG. 1 is a block diagram of a system environment in which an adversarial system, such an online concierge system, operates, according to one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Embodiments described herein relate to a configuration for enhancing user experience within digital environments by balancing supply-demand of products in a digital marketplace and individual users' preference. The configuration may be a system and/or a corresponding process and/or non-transitory computer readable storage medium structured with instructions enabling execution of processes by a processing system (e.g., comprising one or more processors). The system collects data on user behavior within online systems and extracts macro-level data from the collected user data. The macro-level data is associated with overall trends of products offered by an online marketplace without specific user behaviors or preferences.

The system trains a machine learning model using the macro-level data. The machine learning model is trained to receive features of a product as input to generate a supply-demand curve of the product. The features of the product may include (but are not limited to) historical pricing data of the product, quality or grade of the product, variants (e.g., size, color, models) of the product, availability (e.g., how readily available the product is, including stock levels over time), launch date (time since the product was introduced to the market), historical sales volume, historical promotional impact, seasonality data, and weather data.

The system applies the machine learning model to multiple products offered by the online marketplace to generate a supply-demand curve for each product. The system determines placements of at least a subset of products based on the supply-demand curves of the products. In some embodiments, the system also determines a price for each product based on the supply-demand curves. In some embodiments, the placements and/or prices of the products are determined based on an optimizing strategy that optimizes at least one of a total revenue, a total quantity sold, or a unit price of a product. In some embodiments, providers of products are allowed to select one of several optimizing strategies for their products offered on the online marketplace.

The system then predicts a user's interaction with at least one product based on historical data of the user, upon the placements of the subset of products being presented to the user. The user interaction may include (but is not limited to) clicking a link associated with the at least one product, hovering over the at least one product, adding the at least one product in a shopping cart, removing the at least one product from the shopping cart, or completing a transaction purchasing the at least one product. In some embodiments, the user interaction is predicted using a digital twin model trained for each user using that user's historical data. In some embodiments, micro-level data for each user is extracted from the collected user data, and a digital twin model is trained for each user using the micro-level data.

The system adjusts placements of the subset of products based on the predicted user interaction, and presents the adjusted placements of the subset of products to the user. In some embodiments, a user interaction score is determined based on the predicted user interaction. Responsive to determining that the user interaction score is lower than a threshold, the system adjusts the placements. Alternatively, responsive to determining that the user interaction score is lower than a threshold, a new subset of products are selected, and placements of the new subset of products are determined. Based on the placements of the same or different subset of products, a new user interaction score may be determined. In some embodiments, this process repeats as many times as necessary until the user interaction score is greater than the threshold, or when the total number of repeats reaches a preset maximum. After that, the placements of a subset of products corresponding to a high enough user interaction score are presented to the user on a graphical user interface.

Embodiments described herein also relate to a configuration for enhancing user experience within virtual environments by utilizing machine learning techniques, such as reinforcement learning, to develop and refine digital twin models of users. The configuration may be a system and/or a corresponding process and/or non-transitory computer readable storage medium structured with instructions enabling execution of processes by a processing system (e.g., comprising one or more processors). The system collects data on user behavior within online systems and uses this data to train a machine learning model (referred to as a "digital twin" or a "digital twin model") for each user. This digital twin model is trained to simulate how users might interact with various virtual environments.

In some embodiments, training the digital twin models includes conducting experiments in various virtual environments and collecting user data from these experiments. In some embodiments, the trained digital twin models are executed in multiple virtual environment variants to simulate user interactions. The system may determine a set of engagement metrics for each candidate virtual environment based on the simulated user interactions. The sets of engagement metrics are compared to identify a set of engagement metrics that indicates a higher user engagement or satisfaction. An optimal virtual environment associated with the identified set of engagement metrics may then be selected and presented to the user. The user interactions with the selected virtual environment may then be collected and used to refine the digital twin model, such that the digital twin models are continuously refined and improved based on the recent user interactions with the presented virtual environments.

In some embodiments, the system also uses the user data to train a supply-demand prediction model configured to generate a supply-demand curve for each product in a digital market. The system is configured to create virtual environment variants by determining product placements based on generated supply-demand curves and provider goals.

Embodiments described herein provide users with virtual environments that are highly personalized to enhance their experience, engagement and interaction, while also aiding providers in understanding user behaviors and market demands.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments described herein relate to a configuration for enhancing user experience within digital environments by balancing supply-demand of products in a digital marketplace and individual users' preference. The configuration may be a system and/or a corresponding process and/or non-transitory computer readable storage medium structured with instructions enabling execution of processes by a processing system (e.g., comprising one or more processors). The system collects data on user behavior within online systems and extracts macro-level data from the collected user data. The macro-level data is associated with overall trends of products offered by an online marketplace without specific user behaviors or preferences.

The system trains a machine learning model using the macro-level data. The machine learning model is trained to receive features of a product as input to generate a supply-demand curve of the product. The features of the product may include (but are not limited to) historical pricing data of the product, quality or grade of the product, variants (e.g., size, color, models) of the product, availability (e.g., how readily available the product is, including stock levels over time), launch date (time since the product was introduced to the market), historical sales volume, historical promotional impact, seasonality data, and weather data.

The system applies the machine learning model to multiple products offered by the online marketplace to generate a supply-demand curve for each product. The system determines placements of at least a subset of products based on the supply-demand curves of the products. In some embodiments, the system also determines a price for each product based on the supply-demand curves. In some embodiments, the placements and/or prices of the products are determined based on an optimizing strategy that optimizes at least one of a total revenue, a total quantity sold, or a unit price of a product. In some embodiments, providers of products are allowed to select one of several optimizing strategies for their products offered on the online marketplace.

The system then predicts a user's interaction with at least one product based on historical data of the user, upon the placements of the subset of products being presented to the user. The user interaction may include (but is not limited to) clicking a link associated with the at least one product, hovering over the at least one product, adding the at least one product in a shopping cart, removing the at least one product from the shopping cart, or completing a transaction purchasing the at least one product. In some embodiments, the user interaction is predicted using a digital twin model trained for each user using that user's historical data. In some embodiments, micro-level data for each user is extracted from the collected user data, and a digital twin model is trained for each user using the micro-level data.

The system adjusts placements of the subset of products based on the predicted user interaction, and presents the adjusted placements of the subset of products to the user. In some embodiments, a user interaction score is determined based on the predicted user interaction. Responsive to determining that the user interaction score is lower than a threshold, the system adjusts the placements. Alternatively, responsive to determining that the user interaction score is lower than a threshold, a new subset of products are selected, and placements of the new subset of products are determined. Based on the placements of the same or different subset of products, a new user interaction score may be determined. In some embodiments, this process repeats as many times as necessary until the user interaction score is greater than the threshold, or when the total number of repeats reaches a preset maximum. After that, the placements of a subset of products corresponding to a high enough user interaction score are presented to the user on a graphical user interface.

Embodiments described herein also relate to a configuration for enhancing user experience within virtual environments by utilizing machine learning techniques, such as reinforcement learning, to develop and refine digital twin models of users. The configuration may be a system and/or a corresponding process and/or non-transitory computer readable storage medium structured with instructions enabling execution of processes by a processing system (e.g., comprising one or more processors). The system collects data on user behavior within online systems and uses this data to train a machine learning model (referred to as a "digital twin" or a "digital twin model") for each user. This digital twin model is trained to simulate how users might interact with various virtual environments.

In some embodiments, training the digital twin models includes conducting experiments in various virtual environments and collecting user data from these experiments. In some embodiments, the trained digital twin models are executed in multiple virtual environment variants to simulate user interactions. The system may determine a set of engagement metrics for each candidate virtual environment based on the simulated user interactions. The sets of engagement metrics are compared to identify a set of engagement metrics that indicates a higher user engagement or satisfaction. An optimal virtual environment associated with the identified set of engagement metrics may then be selected and presented to the user. The user interactions with the selected virtual environment may then be collected and used to refine the digital twin model, such that the digital twin models are continuously refined and improved based on the recent user interactions with the presented virtual environments.

In some embodiments, the system also uses the user data to train a supply-demand prediction model configured to generate a supply-demand curve for each product in a digital market. The system is configured to create virtual environment variants by determining product placements based on generated supply-demand curves and provider goals.

Embodiments described herein provide users with virtual environments that are highly personalized to enhance their experience, engagement and interaction, while also aiding providers in understanding user behaviors and market demands.

Example System Architecture

Incentivized engagement systems face ongoing challenges of harmonizing the divergent interests of providers and users within open and dynamic online environments. The technical problems include regulating the creation of earned digital currency and managing the pricing and availability of digital goods in a manner that ensures fairness and impartiality for all participants. The conflict arises because the provider and marketplace's goals of maximizing visibility and promoting specific products often clash with the users' goals of efficiency, relevance, and minimal unwanted exposure. Embodiments described herein solve the above-described problem by applying an adaptive adversarial model to manage the pricing, placement, and post-interaction of digital offers. The embodiments acknowledge the adversarial nature of a digital system, where providers aim to maximize digital revenue while users seek the best deals and lower digital prices. The embodiments address both provider's and users' needs through an ensemble of competing machine-learning models, each configured to meet the individual needs of different participants.

Referring now to Figure (FIG. 1, it illustrates an example environment 100, in which an adversarial system 110 may be implemented in accordance with one or more embodiments. In addition to the adversarial system 110, the environment 100 also includes one or more provider client devices 120, one or more user client devices 130, and a network 140. The adversarial system 110, the provider client device(s) 120, and a user client device(s) are configured to communicate with each other via the network 140. The adversarial system 110, the provider client devices 120, and the user client devices 130 are comprised of computing systems having some or all of the component of an example computing architecture as described with FIG. 12.

A provider client device 120 is configured to provide information about its products to the adversarial system 110. The products may be digital or physical. The information about each product may include (but is not limited to) product name and description, product category and subcategory, product features, and specifications, product images and/or videos, inventory levels and replenishment schedules, shipping options, and costs whenever these apply.

A user uses a user client device 130 to access the adversarial system 110. The adversarial system 110 analyzes user data to determine a price for each product offered by a provider and to generate a personalized user interface for a particular user, and transmits the personalized user interfaces to the corresponding user client device 130. Notably, the interests of a provider and a user may clash. For example, a provider may aim to sell more products at higher prices, while a user may seek to find relevant products and buy them at lower prices. The adversarial system 110 balances the interests of both parties (provider and user) in setting product prices and generating personalized user interfaces.

In some embodiments, the adversarial system 110 may provide a list of optimization strategies for selection by a provider through their provider client device 120. The providers may be able to select one of the optimization strategies based on their goals. The list of optimization strategies may include (but are not limited to) a total revenue, a quantity sold, and a unit price. The total review strategy aims to maximize earnings for a whole inventory of the provider in a period, a quantity sold strategy aims to maximize product adoption, and a unit price strategy aims to maximize a unit price of each item.

In some embodiments, providers, through their respective provider client device 120, are also allowed to provide additional constraints or requirements that are taken into consideration during the optimization process. Such constraints or requirements may include (but are not limited to) a minimum acceptable price or breakeven price, a target sales volume, time-sensitive promotions or discounts, and product bundling preferences.

The adversarial system 110 adaptively trains an adversarial model or a set of models that are adversarial to each other based on data describing both providers and users. The data include digital product feature data, system data, and behavior data associated with both providers and users. The adversarial model is configured to make informed decisions that balance the competing interests of providers and users, thereby driving sustained growth in the online environment.

In some embodiments, a first set of machine learning models is trained to mimic users' behavior in the online environment 100. These models are referred to as "digital twins." A second set of machine learning models is trained to predict the supply and demand of a product in the online environment 100. The two sets of machine learning models are "adversarial" to each other, working together to generate a set of balanced output for users. Further, the two sets of machine learning models are continuously trained and optimized by recent user behavior and market trends to adapt to changes in users and the marketplace.

For example, a provider might want to prominently feature a high-margin product on a homepage, even if it is not relevant to a particular user's interests. The digital twin, which is a machine learning model trained to act on behalf of the user, penalizes such a web based storefront for irrelevant product exposure and potentially poor navigation efficiency if it hinders the user's ability to find desired items. By evaluating various storefront configurations and using the digital twin's feedback, the adversarial system 110 identifies layouts and strategies that strike a balance between the competing goals of providers and users. This leads to a marketplace where providers can effectively promote their products while ensuring users enjoy a personalized, efficient, and relevant shopping experience. The adversarial system 110 prevents sellers from dominating the user experience with irrelevant promotions, ensuring a fair and balanced marketplace for both providers and users. By prioritizing user preferences and minimizing unwanted exposure, the adversarial system 110 enhances user satisfaction and encourages repeat interactions. The adversarial dynamic drives continuous optimization, leading to a more efficient and effective ecosystem.

Figure 2:
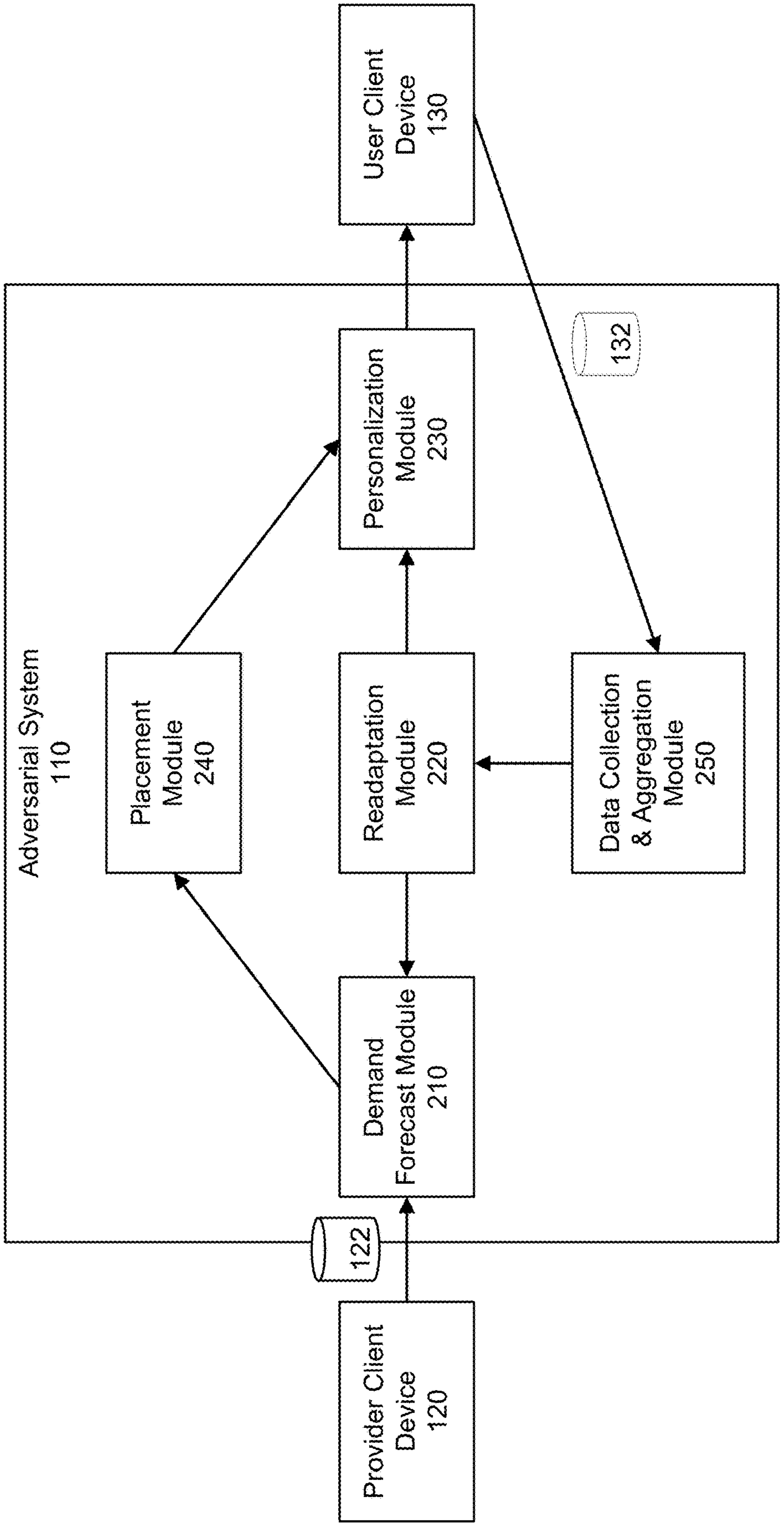
FIG. 2 illustrates an example architecture of the adversarial system in accordance with one or more embodiments.

Turning not to FIG. 2, it illustrates an example architecture of the adversarial system 110 in accordance with one or more embodiments. The adversarial system 110 includes a demand forecast module 210, a readaptation module 220, a personalization module 230, a placement module 240, and a data collection and aggregation module 250. A module may be configured as a processing system that include a software program structured with program code (e.g., instructions) corresponding to the functionality described and executable by a computing system, e.g., having some or all of the components of the computing system as described with FIG. 12. Some modules may be configured in hardware with executable code (firmware) corresponding to the functionality.

The data collection and aggregation module 250 is configured to collect and aggregate user data 132 from user client devices 130. The user data includes data describing user attributes and user behavior within the adversarial system 110. Such user data may include browsing history, purchase history, search queries, clickstream data, cart addition and removals, user location and demographics, device and access information, login data, feedback and ratings, and social media interactions. Browsing history may include information on which pages a user visits, how much time they spend on each page, and the sequence of their navigation through the site. Purchase history may include records of what items a user purchases, when they purchase them, how frequently they make purchases, and an average spending per purchase. Search queries may include data on what items or types of items users search for, including the specific terms they enter in a search bar.

Clickstream data may include details of every click a user makes while navigating the adversarial system, which can help in understanding user preferences and the effectiveness of page layout and design. Cart addition and removals may include information on what items users add to or remove from their shopping cart, which can indicate purchasing intent and interest levels in specific products. User location and demographics may include geographic location data, possibly down to a city or region level, along with demographic information such as age and gender if available. Device and access information may include data on the type of device used to access the adversarial system 110 (e.g., mobile, tablet, personal computer), the operating system, and the browser type, which can help in optimizing the adversarial system for different device types. Login data may include frequency of logins, login session durations, and account activity in each session which can indicate user engagement or satisfaction levels. Feedback and ratings may include user-generated content such as product reviews, ratings and other feedback, which can provide insights into product satisfaction and areas for improvement. Social media interactions may include data from integration with social media platforms including likes, shares, and comments related to products listed on the adversarial system or the adversarial system itself.

The data collection and aggregation module 250 is configured to organize the user data received from user client devices 130 and send the organized user data to the readaptation module 220 for further analysis. The readaptation module 220 uses machine learning to process the user data. In some embodiments, the readaptation module 220 is configured to train a machine learning model for demand forecasting, price optimization, and product placement.

In some embodiments, the readaptation module 220 trains multiple models for demand forecasting, price optimization, and product placement. The demand forecast module 210 selects model that is best suited for generating a demand curve for the product. The demand curve shows a relationship between product price and quantity demanded, indicating how sensitive buyers are to changes in price. The demand forecast module 210 may also determine how popular and competitive the product is within the adversarial system. The demand forecast module 210 may also identify potential bundling opportunities and the effects of competitive products on pricing and placement strategies. The placement module 240 then uses the determination of the demand forecast module 210 to determine a pricing and placement of the product.

In some embodiments, the readaptation module 220 is configured to train a model for each user to simulate the corresponding user's behavior. These models are referred to as "digital twins." The personalization module 230 applies the digital twins of users to generate a personalized storefront for each user. In some embodiments, the digital twins receive the pricing and placement of many products and generate a personalized storefront based on the pricing and placement of those products. The personalized store front is then sent to the user client devices 130 of the corresponding users.

Example Data Collection and Aggregation

Figure 3:
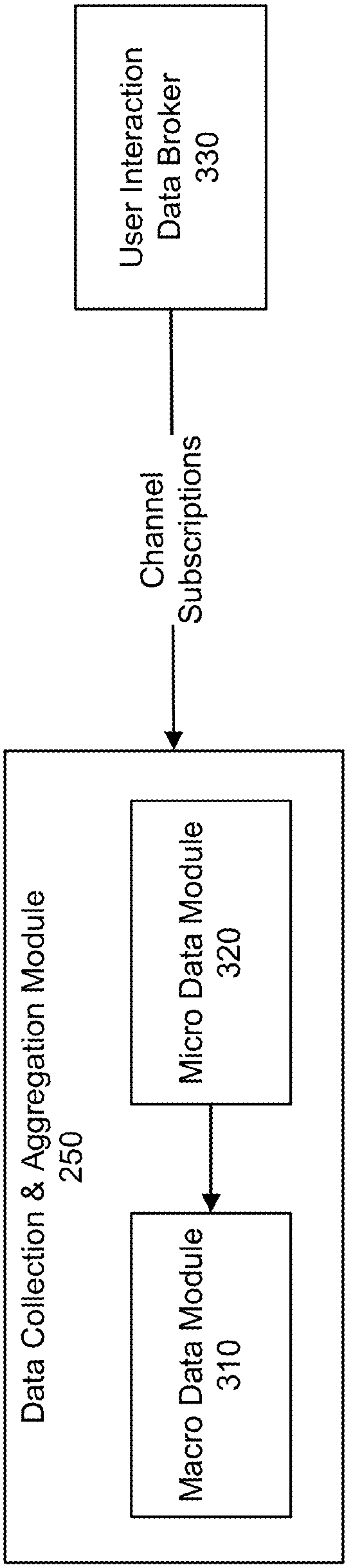
FIG. 3 illustrates an example architecture of a data collection and aggregation module 250 in accordance with one or more embodiments.

FIG. 3 illustrates an example architecture of a data collection and aggregation module 250 in accordance with one or more embodiments. The data collection and aggregation module 250 includes a macro data module 310 and a micro data module 320. Macro data is referred to data that reflect overall market place trends. Micro data is referred to data that reflects user-specific behavior. The macro data module 310 is configured to collect and aggregate macro data, and the micro data module 320 is configured to collect and aggregate micro data. In some embodiments, a user interaction data broker 330 is configured to collect user data from each user client device 130 and make the collected user data available to the data collection and aggregation module 250. Additional details about the user interaction data broker 330 are further described below with respect to FIG. 4.

In some embodiments, the micro data module 320 receives individual user data from the user interaction data broker 330 and analyzes it in real-time to uncover significant patterns, trends, and insights. The micro data module 320 organizes and classifies the data based on user profiles, behavioral patterns, and other related factors through several steps, such as data transformation, data enrichment, feature extraction, pattern detection, and near real-time update, among others. During the data transformation step, the data is normalized and standardized to ensure consistency and comparability across various data points and users. During data enrichment step, the data is enhanced by integrating additional relevant information, such as user demographics or past purchase history, to provide a deeper understanding of user behavior. During feature extraction step, features that aid in understanding user behavior and preferences are selected. Such features may include viewed product categories, time spent on pages, or frequency of visits. In some embodiments, a subset of features are selected to reduce dimensionality. In some embodiments, principal component analysis (PCA) and/or t-distributed stochastic neighbor embedding (t-SNE) methods are applied to decrease the number of features while preserving essential information.

During the pattern detection step, clustering, anomaly detection, and sequence analysis may be performed. In some embodiments, unsupervised machine learning algorithms such as K-Means, DBSCAN, and hierarchical clustering may be applied to segment users based on their behavior patterns and preferences, aiding in the identification of distinct user groups. In some embodiments, statistical methods or machine learning algorithms, such as isolation forest and autoencoders, are used to detect unusual behavior patterns or anomalies that might suggest fraud or other concerns. In some embodiments, Markov chains and recurrent neural networks (RNNs) may be used to examine a sequence of user actions, and events (e.g., clickstreams) to discern common behavioral patterns or trends.

During the near real-time update step, the micro data module 320 dynamically updates the extracted patterns, trends, and insights as new user interaction data becomes available, refining the data processing continuously. The micro data module 320 also monitors the performance of the adversarial system. For example, in some embodiments, the micro data module 320 accesses the efficacy of the entire process and adjusts the volume of data batches processed to prevent bottlenecks.

The macro data module 310 is configured to receive and aggregate data and extract macro-level insights that shape the marketplace. In some embodiments, macro data module 310 receives data directly from the user interaction data broker 330. Alternatively or in addition, macro data module 310 receives data from micro data module 320, which receives data from user interaction data broker 330. By consolidating user-specific behaviors and trends, the macro data module 310 identifies common patterns and preferences, while filtering out anomalies that do not significantly impact the broader market dynamics. The macro data module 310 organizes and categorizes the aggregated data, ensuring it is structured and readily accessible for other modules. In some embodiments, the macro-level data is stored in a non-relational database for machine learning purposes.

Data collected by the macro data module 310 and micro data module 320 may be categorized using a variety of factors to facilitate analysis. User demographics such as age, gender, location, and income help group users with similar characteristics, while user preferences like favorite brands, product categories, and styles help categorize users based on their interests. User behavior patterns, including browsing, searching, and purchasing habits, identify distinct consumer types such as frequent shoppers, impulse buyers, or deal hunters. Additionally, product categories that users are interested in help in recognizing trends and patterns within specific segments like electronics, apparel, or home goods.

The data can also be organized based on time frames—daily, weekly, or monthly—to pinpoint seasonal trends and sales patterns, as well as changes in user behavior over time. Moreover, event-based categorization, which includes data grouped by promotional campaigns, holidays, or product launches, helps evaluate the impact of these events on user behavior.

To manage and process extensive volumes of user behavioral data effectively, the data collection and aggregation module 250 may utilize advanced database technologies. NoSQL databases such as MONGODB, CASSANDRA, or COUCHBASE, known for their scalability and flexibility, are ideal for handling large volumes of unstructured or semi-structured data. Such advanced database technologies provide efficient storage and quick retrieval options. Columnar databases like APACHE HBase or GOOGLE Bigtable offer efficient compression and querying capabilities for handling data rich in attributes. Furthermore, time-series databases such as InfluxDB or TimescaleDB are specifically designed for managing time-based data, which is essential for tracking user behavior patterns over time and efficiently storing and querying large volumes of time-stamped data. Through these sophisticated organizational and technological strategies, the data collection and aggregation module 250 enables the adaptive adversarial system to continuously learn from and adapt to the dynamic behaviors of participants, thereby enhancing the overall efficiency and responsiveness of the adversarial system 110.

Figure 4:
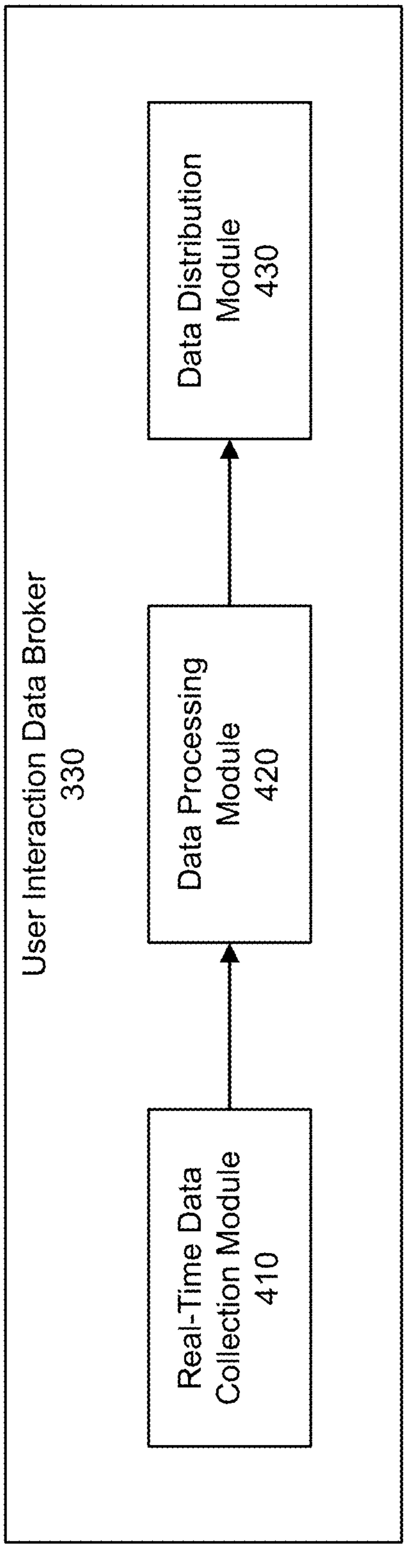
FIG. 4 illustrates an example architecture of the user interaction data broker in accordance with one or more embodiments.

FIG. 4 illustrates an example architecture of the user interaction data broker 330 in accordance with one or more embodiments. The user interaction data broker 330 acts as a bridge, connecting the users' activities in the adversarial system with the data-driven decision-making processes, ensuring that all user interactions are captured and utilized efficiently. To handle the high volume of data generated by user interactions, the user interaction data broker 330 may employ an open-source module or a proprietary module, such as AMAZON Kinesis, GOOGLE Cloud Pub/Sub, Azure Event Hubs, IBM Event Streams, APACHE Kafka, and RabbitMQ. The data broker 330 is capable of handling a significant volume of events per second, which is advantageous for real-time data processing and efficient management of data flow within the adversarial system.

The user interaction data broker 330 includes a real-time data collection module 410, a data processing module 420, and a data distribution module 430. The real-time data collection module 410 is configured to capture data generated by user interactions in real-time. This includes clicks, page navigations, transaction data, and any user-generated events that occur during their interaction with the adversarial system. The real-time data collection module 410 may perform client-side tracking using JavaScript or front-end technologies configured to capture user interactions on a web page (e.g., clicks, page views, dwell time). This tracking code sends the collected data to a server as the user interacts with a personalized storefront. The real-time data collection module 410 may also perform server-side tracking, including transaction information, user authentication, and account updates. These events are generated as a result of user interactions with the adversarial system, and are logged by the server.

The data processing module 420 is configured to receive data from the real-time data collection module 410 and preprocess the collected data to ensure that it is in a suitable format for further analysis and processing. This may include data cleaning, normalization, and transformation tasks (e.g., handling missing or corrupted data, filtering out irrelevant data, data normalization, data reduction, and feature extraction) that help to standardize the data and make it more easily interpretable by the other modules within the adversarial system.

The data distribution module 430 is configured to receive the data preprocessed by the data preprocessing module 420 and distribute the data to appropriate modules within the adversarial system for further analysis and processing. This may include transmitting micro-level interaction data to the micro data module 310 and macro-level data to the macro data module 320.

In some embodiments, the real-time data collection module 410 may support a variety of messaging patterns and protocols, making it highly adaptable to different user interaction scenarios. As such, the real-time data collection module 410 can handle diverse data flows, accommodating various user interaction types and system demands. In some embodiments, the real-time data collection module 410 may be configured for both horizontal and vertical scaling, such that the real-time data collection module 410 can manage increasing data volumes and more complex system requirements without compromising performance. This scalability is advantageous as it allows the real-time data collection module 410 to grow alongside the expanding needs of the adversarial system.

In some embodiments, the real-time data collection module 410 includes mechanisms to ensure reliable message delivery and data persistence, providing a safeguard against data loss in the event of system failures or disruptions. Features such as message acknowledgments, persistent message storage, and high availability are implemented. In some embodiments, the real-time data collection module 410 is optimized for deployment on cloud platforms, such that the data broker benefits from scalable resources and managed services provided by these cloud platforms. This setup facilitates seamless integration with other cloud-based services and allows for efficient resource management.

The data processing module 420 is configured to process and transform the collected raw data into a structured format suitable for analysis and decision-making. The data distribution module 430 is configured to distribute the processed data to various consumer modules. In some embodiments, the data distribution module 430 is based on a publish-subscribe pattern. This pattern is advantageous in managing the flow of real-time data between data producers and consumers within the adversarial system 110. In some embodiments, the data broker utilizes different channels to organize and categorize user interaction data. Each channel is configured for a specific type of user interaction, such as clicks, page views, or transactions, ensuring that data is properly sorted and directed. In some embodiments, both client-side and server-side components that track user interactions may act as producers. The producers are configured to publish user interaction data to the designated channels as events occur.

In some embodiments, various system modules that require user interaction data, such as macro data module 310 and micro data module 320, may act as consumers of the data broker 330. These consumers may subscribe to the appropriate channels and receive updates in real-time as new data becomes available. Through this data handling architecture, the user interaction data broker 330 effectively bridges the gap between user activities and consumer modules.

Example Machine Learning Model Configurations

Figure 5:
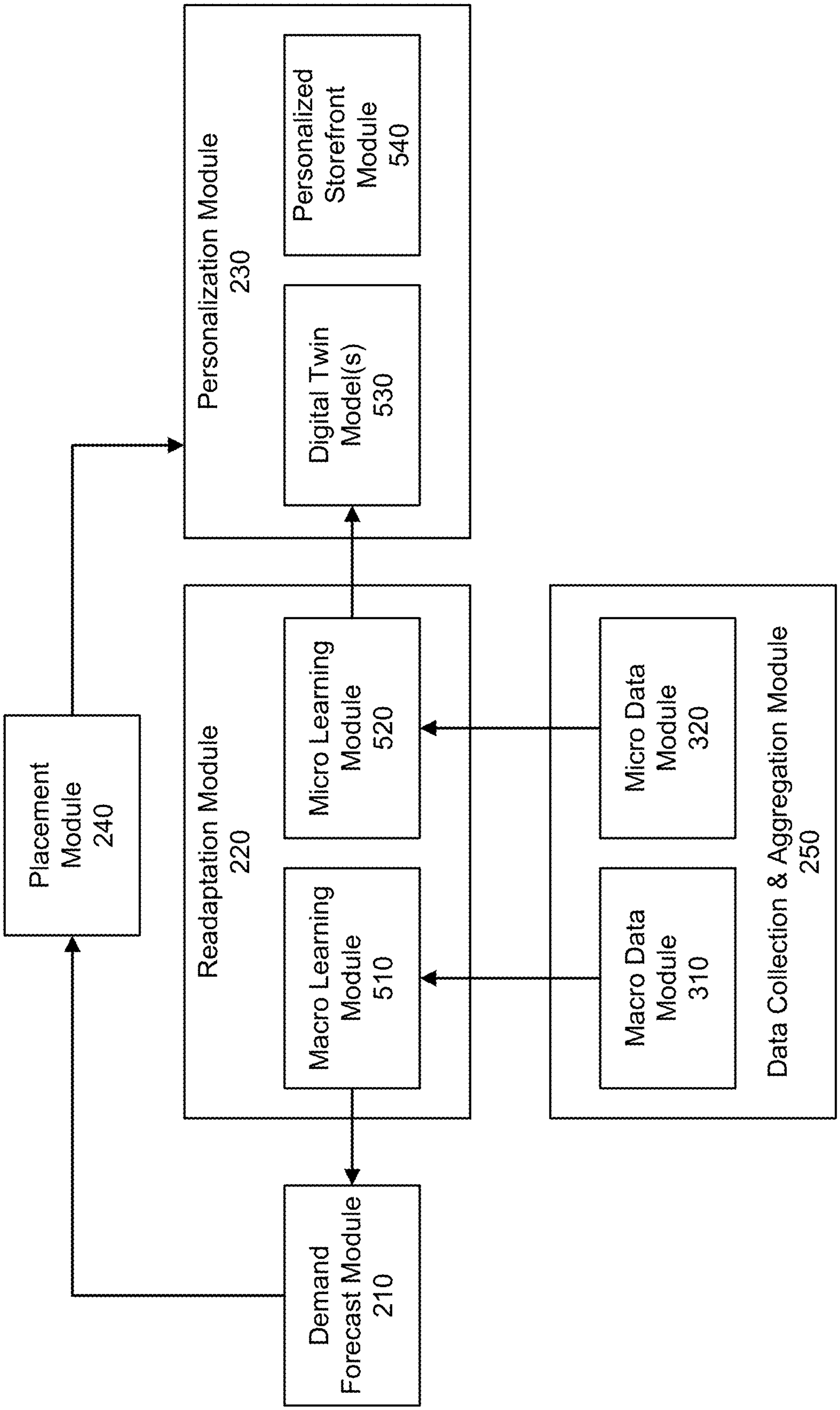
FIG. 5 illustrates an example architecture of readaptation module in accordance with one or more embodiments.

FIG. 5 illustrates an example architecture of readaptation module 220 in accordance with one or more embodiments. As described above with respect to FIGS. 2-4, macro data module 310 and micro data module 320 provide the macro and micro level data respectively to the learning modules 510, 520. Demand forecast module 210 is configured to use outputs from the readaptation module 220 to predict supply and demand for a product. Placement module 240 is configured to receive the predicted supply and demand of the product from the demand forecast module 210, and determine a placement and/or price of the product based on the supply and demand of the product.

The readaptation module 220 includes a macro learning module 510 and a micro learning module 520. The macro learning module 510 is configured to analyze macro data (received from the macro data module 310) and use the macro data (received from the macro data module 320) to train one or more machine learning models to determine the supply and demand of a given product. These machine learning models are accessible and applied by the demand forecast model 210.

On the other side, the micro learning module 520 is configured to analyze micro data and use the micro data to train a digital twin 530 for each user. The digital twin 530 is accessible and applied by the personalized module 230. The personalization module 230 includes a personalized store front module 540 configured to apply the user specific digital twins 530 to generate a personalized store front for each user. In some embodiments, the personalized storefront module 540 is configured to generate a set of different storefronts, and applies a digital twin 530 to each of the storefronts to simulate user behavior. Based on the user behavior for each storefront, the personalized storefront module 540 select a storefront that corresponds to the most desirable user behavior, e.g., click rate, purchase rate, among others.

Example Training Digital Twins

Figure 6:
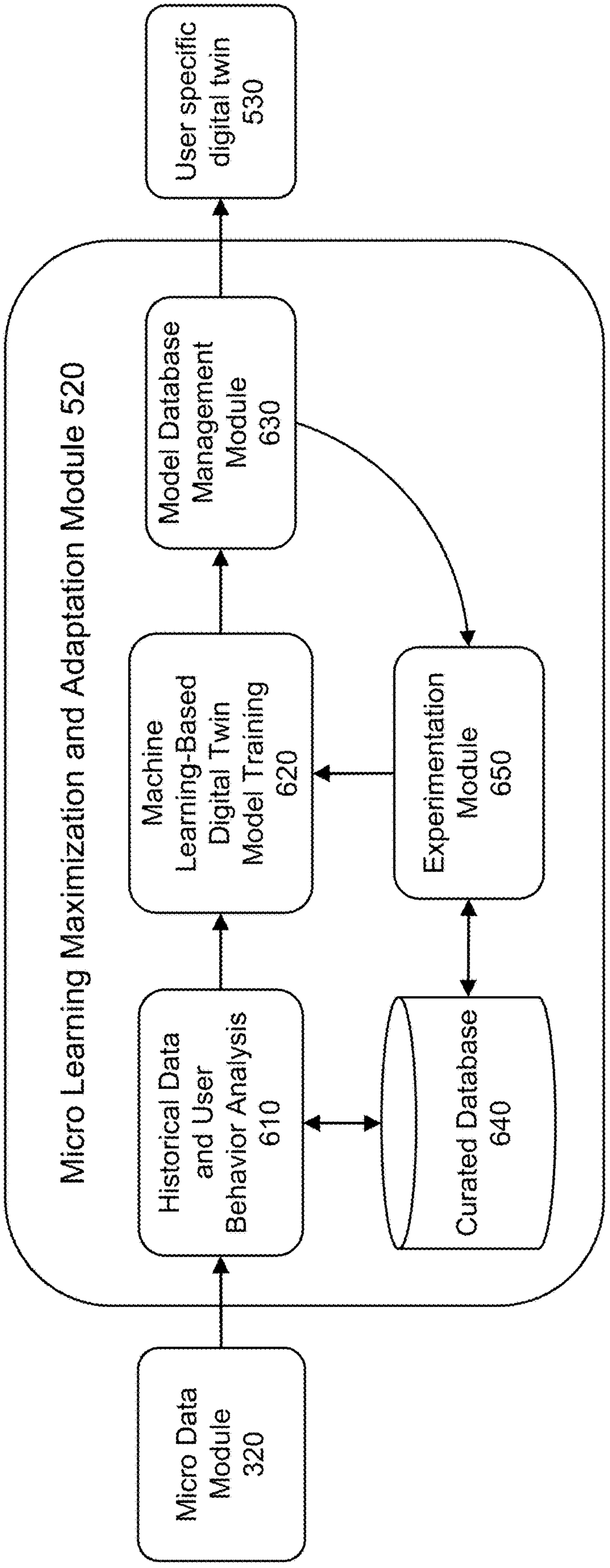
FIG. 6 illustrates an example architecture of the micro learning module in accordance with one or more embodiments.

FIG. 6 illustrates an example architecture of the micro learning module 520 in accordance with one or more embodiments. The micro learning module 520 includes a historical user data analysis module 610, a digital twin training module 620, a model database management module 630, a database 640 and an experimentation module 650. The database 640 may be a non-relational database configured to store and manage preprocessed and engineered data from other nodules. The database 640 is configured to augment the data from micro data module 310.

The historical user data analysis module 610 receives micro-level data from the micro data module 320 and analyzes the received data. Such data may include (but is not limited to) historical user interaction data, demographic information, browsing history, and purchase patterns to identify patterns, trends, and preferences. The analysis of historical data and user behavior is performed automatically using various data mining and machine-learning techniques. In some embodiments, the historical user data analysis module 610 is configured to perform data preprocessing, clustering, anomaly detection, time series analysis, and/or automatic alerts. Data preprocessing includes cleaning and preprocessing the raw data and handling missing values, outliers, and inconsistencies via imputation, normalization, and data transformation techniques.

Clustering may be performed by applying clustering algorithms, such as K-means, DBSCAN, and hierarchical clustering, to group users with similar behavior patterns, trends, and preferences. In some embodiments, the clustered data is used as an engineered feature by other machine learning models. Anomaly detection may be performed via statistical methods, such as IQR method and Z-score, and machine learning techniques, such as isolation forests, local outlier factors, one-class SVMs, and autoencoders to detect unusual behavior patterns that could indicate issues with the adversarial system 110 or potential fraud.

Time series analysis may include analyzing user interactions over time to identify seasonality, trends, and other temporal patterns that can be used as engineered features for other machine learning processes. In some embodiments, time series analysis is performed via methods like ARIMA, exponential smoothing, seasonal decomposition in conjunction with other algorithms like prophet, recurrent neural network (RNNs), long short term memory (LSTM).

Based on the results of the analysis, the historical user data analysis module 610 can generate automatic alerts for significant changes in user behavior or potential issues with the market place. Alerts can be triggered by predefined thresholds or dynamically determined using machine learning techniques such as change point detection. The results of the analysis are stored in the database 640.

The digital twin training module 620 receives the analyzed user data from historical user data analysis module 610 and uses the received data to train and refine machine learning models for each user to create digital twins. These models predict user preferences, helping to create a personalized shopping experience. Training and refining the digital twins may include steps of data preparation, model selection, model training, model evaluation, model refinement, and model deployment.

During the step of data preparation, the preprocessed and engineered data from the previous module 610 is split into training, validation, and testing sets. Each set represents the user population's diverse behavior patterns and preferences. During the step of model selection, a subset of models from an available set of models is selected. The set of models may include (but are not limited to) random forests, extreme gradient boosting, and deep learning techniques, such as neural networks, or RNNs. The selection criteria include the available dataset for a specific user that suits the training need for a particular model. During the step of model training, the selected models are trained on the training set. Hyperparameters and model architectures are adjusted as needed to minimize the loss function and maximize the predictive performance. During the step of model evaluation, the trained models are evaluated on the validation set to determine their performance. The best model is selected based on their performance. Metrics like mean absolute error (MAE), root mean squared error (RMSE), or precision and recall may be used depending on the objective variable. The performance metrics are stored in the database 640.

The model database management module 630 is configured to receive the trained digital twin models from the digital twin training module 620 and maintain a database of digital twins 530 for individual users and update them as new data becomes available. The model database management module 630 also provides the database of digital twins to the personalization module 230.

The experimentation module 650 has access to the digital twin 530 via the model database management module 630 and is configured to conduct targeted experiments to gather more information to refine or update the digital twins responsive to identifying gaps in training data and/or identify user behavior changes. These experiments are configured to minimize any negative impact on the overall performance of the adversarial system. The conduction of targeted experiments may include steps of gap identification, gap business value appraisal, hypothesis generation, experiment design, and experiment execution.

During the step of gap identification, the experimentation module 650 analyzes the training data and model performance metrics to identify areas where the data is insufficient or where the model performs poorly. This may be performed via a density analysis of the data points in a particular region and anomaly detection algorithms applied to the model's error.

During the step of gap business value appraisal, each gap is evaluated for the uncertainty it brings to the models and the potential value it can provide to the adversarial system. If the uncertainty has a high potential of providing more value to the business above a predefined threshold, the gap is selected for refinement. This threshold may be determined based on a cost of refining a gap through experimentation, balanced with the potential benefit. The gap may be appraised by testing how metrics such as increased sales or increased margins could be affected according to the missing information. This may be performed by simulating what would happen if the predictions from the model for a specific feature were higher or lower, according to the current uncertainty for that gap. Models like Monte Carlo simulations and sensitivity analysis may be used to evaluate the gap.

During the step of hypothesis generation, for the selected gaps, the experimentation module 650 tests a series of hypotheses about potential reasons for the identified gaps or poor performance, such as missing data points for a specific price range, unaccounted user preferences, or insufficient predictive power of the features. Methods like statistical tests (including t-tests, chi-square tests, and ANOVA tests), feature importance analysis, and correlation analysis are used to test whether a hypothesis is plausible or not.

During the step of experiment design, depending on the settled hypothesis, the experimentation module 650 executes a series of predefined experiments to test the hypotheses and gather more information. The experiments are configured to minimize any negative impact on the adversarial system's overall performance. In some embodiments, the experimentation module 650 is configured to perform A/B testing, multivariate testing, or bandit algorithms that change the outcome of the digital twin for a specific set of users.

During the step of experiment execution, experimentation module 650 executes the experiments, monitors the results in real-time, and has the ability to terminate the experiment at any moment or request human intervention in case the experiment threatens to affect the current business value or interfere with the operation of the adversarial system.

In some embodiments, A/B testing includes comparing two or more versions (A and B) of a webpage or application to determine which performs better in achieving a specific goal. Traffic is randomly divided between variations, ensuring that each version is exposed to a similar audience. User behavior and relevant metrics are tracked for each variation to assess their effectiveness. Based on the collected data, the better performing variation is identified and implemented.

In some embodiments, multiple virtual storefronts, each with different product placements, layouts, and promotional strategies, act as variations in the A/B testing framework. The digital twin 530, representing a user, acts as the test subject interacting with the various storefront variations. Instead of random traffic splitting, the adversarial system 110 shows several variations to the same user via their digital twin 530. The adversarial system 110 then uses the digital twin 530's preferences and behavior to personalize the selection of storefront variations it interacts with. This ensures that the tested variations are relevant to the specific user and their goals. The digital twin 530's interactions within each storefront are tracked and evaluated in real-time, providing immediate feedback on the effectiveness of each variation based on the scoring criteria. The adversarial system 110 continuously learns from the digital twin 530's feedback and adapts the selection of storefront variations for further testing. This iterative process allows for ongoing optimization and refinement of the storefronts.

Unlike traditional A/B testing, which can take days or weeks to collect sufficient data, the digital twin 530 approach provides immediate feedback on storefront performance. The adversarial system 110 can adapt to changes in user behavior and market conditions in real-time, ensuring that storefront optimization remains relevant and effective. The use of digital twins 530 allows for personalized A/B testing, where storefront variations are tailored to individual user preferences and goals. The adversarial system 110 can efficiently test numerous storefront variations concurrently, enabling rapid optimization and exploration of different strategies. The effectiveness of the real-time A/B testing approach relies on the accuracy of the digital twin 530 in representing the user's behavior and preferences. Continuous refinement of the digital twins 530 based on real user data, as depicted in the invention, is advantageous.

The digital twin 530 is trained to simulate various user actions within the virtual storefronts, such as browsing product categories, using search functions with specific keywords, filtering products based on criteria (e.g., price, brand, etc.), adding items to the shopping cart, completing the checkout process, and engaging with promotional offers and recommendations. Each interaction is tracked and analyzed to evaluate the storefront's effectiveness based on user-selected goals. For example, if a digital twin 530 takes excessive time to locate a specific product using search or browsing, it negatively impacts the storefront's score for efficiency. The adversarial system 110 tracks the types of products presented to the digital twin 530 and penalizes storefronts that display irrelevant or unwanted items based on the user's preferences. The adversarial system 110 analyzes the digital twin 530's navigation path and identifies any difficulties encountered, such as confusing layouts or broken links, which negatively affect the storefront's score for user-friendliness.

The adversarial system 110 initially selects a diverse set of virtual storefronts for the digital twin 530 to interact with, some of these storefronts could be curated by diverse sellers as well as by the marketplace, considering factors such as product category, seller reputation, and current popularity. The digital twin 530 performs a series of predefined tasks within each storefront, simulating the represented user's typical journey with specific goals in mind. Each interaction is assigned a score based on its success in achieving the user-selected goals. The adversarial system 110 aggregates these scores to provide overall feedback on the storefront's effectiveness. Based on the digital twin 530's feedback, the adversarial system 110 may refine the selection of storefronts for further interactions, focusing on those that performed well or those requiring further optimization.

User-selected goals, such as finding specific products quickly, discovering new items of interest, or avoiding specific brands, are directly incorporated into the digital twin 530's evaluation criteria. Different interaction types are weighted based on their relevance to the user's goals. For instance, if the user prioritizes finding products quickly, the time spent searching will have a higher impact on the storefront's score than the exposure to promotional offers. Real user feedback, collected through surveys or implicit data analysis, is used to refine the digital twin 530's behavior and ensure alignment with evolving user preferences and expectations.

By simulating user interactions and optimizing storefronts based on individual preferences, the adversarial system 110 creates a more personalized and engaging shopping experience. The iterative feedback loop allows sellers to continuously improve their storefronts, leading to increased customer satisfaction and potentially higher volumes of spending. The adversarial system 110 adapts to changing market conditions and user behavior, ensuring a dynamic and efficient e-commerce ecosystem that benefits both providers and users.

Navigation efficiency (NE) may be used to measure the ease and speed of navigating through the storefront.

$$NE = 1 - (\text{T\_avg} / \text{T\_max}) \quad (1)$$

where T_avg is the average time taken by the digital twin 530 to complete navigation tasks (e.g., finding specific products, accessing different categories), and T_max is a predefined maximum allowable time for each task.

The weight of NE can be adjusted based on user preferences. Users who prioritize a quick and efficient shopping experience will have a higher weight assigned to this metric.

Product findability (PF) may be used to evaluate how easily the digital twin 530 can locate desired products within the storefront.

$$PF = \text{N\_found} / \text{N\_total} \quad (2)$$

where N_found is the number of target products successfully found by the digital twin 530, and N_total is the total number of target products the digital twin 530 intended to find.

Similar to NE, the weight of PF can be adjusted based on user preferences. Users who value a wide product selection and ease of finding specific items will have a higher weight assigned to this metric.

Relevance of recommendation (RR) may be used to assess the relevance of product recommendations and promotional offers presented to the digital twin 530.

$$RR = \text{N\_relevant} / \text{N\_total\_recs} \quad (3)$$

Where N_relevant is the number of recommended products that align with the user's preferences and past behavior, and N_total_recs is the total number of recommendations presented to the digital twin 530.

Users who appreciate personalized recommendations and targeted offers will have a higher weight assigned to this metric.

Unwanted product exposure (UPE) may be used to measure the extent to which the digital twin 530 encounters irrelevant or unwanted products during browsing or searching.

$$UPE = 1 - (\text{N\_unwanted} / \text{N\_total\_products}) \quad (4)$$

Where N_unwanted is the number of irrelevant or unwanted products presented to the digital twin 530, and N_total_products is the total number of products encountered during the interaction.

Users who prefer a focused shopping experience with minimal exposure to irrelevant items will have a higher weight assigned to this metric.

The overall storefront score may be calculated as a weighted sum of the individual metric scores.

$$\text{Overall Score} = \text{W\_NE} * NE + \text{W\_PF} * PF + \text{W\_RR} * RR + \text{W\_UPE} * UPE \quad (5)$$

where W_NE, W_PF, W_RR, and W_UPE represent the weights assigned to each metric based on user preferences.

In some embodiments, the adversarial system 110 can dynamically adjust weights based on the user's real-time behavior and feedback. For example, if a user repeatedly uses search functions, the weight of PF might be increased to prioritize findability. Different user segments (e.g., bargain hunters and brand-loyal customers) can have predefined weighting profiles to tailor the evaluation process to their specific needs and preferences.

The adversarial system 110 applies a comprehensive model to determine when to stop iterating the adversarial storefront optimization process. The model balances multiple factors, including convergence, performance, and computational efficiency. Convergence ensures the storefront scores are stabilizing and further iterations yield minimal improvement. Performance target achieves a desired level of performance that meets user expectations and business objectives. Computational efficiency avoids excessive computational costs associated with running numerous iterations.

$$\Delta\text{S\_n} < \varepsilon\text{\_d} * \text{S\_n} \text{ (Dynamic Convergence Threshold)} \quad (6)$$

where ΔS_n=|S_n−S_(n−1)|(Absolute change in overall score), ε_d=α*ε_(d,n−1)+(1−α)*(ΔS_(n−1)/S_(n−1)) (Dynamic threshold based on relative change), and S_n=Overall storefront score at iteration n.

This condition checks if the relative change in the overall storefront score falls below a dynamically adjusted threshold. The threshold adapts based on the score's historical relative changes, allowing for more flexibility than a fixed threshold.

$$\text{S\_n} \geq T \text{ (Performance Target)} \quad (7)$$

where T=Predefined target score for acceptable performance.

This ensures the storefront reaches a predefined level of performance before stopping iterations. This target score should reflect a balance between user satisfaction and business goals.

$$n \geq \text{N\_min} \text{ (Minimum Iteration Requirement)} \quad (8)$$

where N_min=Minimum number of iterations to ensure sufficient exploration, and α=Smoothing factor for dynamic threshold (e.g., 0.8).

This condition prevents premature stopping before exploring a sufficient number of variations. This is important to avoid getting stuck in local optima and missing potentially better solutions.

For further robustness, additional stopping criteria like statistical stability or a cost-benefit analysis, depending on the specific needs and priorities of the adversarial system 110 can be integrated. Different stopping criteria or adjusted parameter values (ε_d, T, N_min) based on user segments and their individual preferences. For example, users who prioritize efficiency might have a lower performance target and a higher convergence threshold can be integrated. In some embodiments, the adversarial system 110 may use machine learning models to predict optimal stopping points based on historical data and real-time performance trends.

$$\varepsilon\text{\_d} = \alpha * \varepsilon\text{\_}(d, n-1) + (1-\alpha) * (\Delta\text{S\_}(n-1) / \text{S\_}(n-1)) \quad (9)$$

where ε_d represents the dynamic convergence threshold at the current iteration (n).

Equation 9 updates the dynamic convergence threshold (ε_d) used in the stopping criteria for the adversarial system. ε_d determines how much relative change in the storefront score is considered acceptable before stopping the optimization process. α is a smoothing factor, typically between 0 and 1 (e.g., 0.8). It controls how much weight is given to the previous threshold value (ε_(d,n−1)) versus the current relative change in score. A higher a value gives more weight to the historical trend, making the threshold adjust slower and smoother. ε_(d,n−1) is the dynamic threshold from the previous iteration (n−1). It provides historical context for the threshold's adjustment. ΔS_(n−1) represents the absolute change in the overall storefront score between the current and previous iteration, calculated as |S_n−S_(n−1)|. S_(n−1) is the overall storefront score from the previous iteration.

Equation 9 is a weighted average that combines the previous threshold value with the current relative change in score. The term α*ε_(d,n−1) ensures that the threshold doesn't change too abruptly and considers the historical trend of score changes. This helps to avoid premature stopping due to minor fluctuations in performance. The term (1−α)*(ΔS_(n−1)/S_(n−1)) incorporates the relative change in score from the previous iteration. If the relative change is large, it suggests that further optimization might be beneficial, so the threshold is adjusted upwards to allow for more exploration. Conversely, if the relative change is small, it indicates that the scores are stabilizing, and the threshold is adjusted downwards, moving closer to stopping the iterations.

The threshold adapts to the specific optimization scenario and the rate of improvement observed in the storefront scores. This allows for more efficient optimization compared to using a fixed threshold. By considering the historical trend of score changes, the dynamic threshold helps to avoid stopping iterations prematurely due to minor fluctuations or temporary plateaus in performance. The smoothing factor α ensures a gradual adjustment of the threshold, leading to a smoother convergence process and avoiding oscillations in the stopping decision.

The choice of a depends on the desired responsiveness of the threshold. The threshold adjusts slower and is less sensitive to individual fluctuations in score changes. This is suitable for scenarios where stability and avoiding premature stopping are priorities. The threshold reacts more quickly to changes in score and is more sensitive to recent improvements. This can be beneficial when rapid optimization is desired, but it might also increase the risk of stopping prematurely due to temporary fluctuations.

For the first iteration (n=0), the value of ε_d (dynamic convergence threshold) is typically initialized using a predefined value called initial_epsilon. This is because there's no historical data on score changes yet to dynamically adjust the threshold. The initial_epsilon should be chosen based on the expected magnitude of relative changes in the storefront score during the initial iterations. Larger initial_epsilon allows for more exploration and is suitable for scenarios where significant improvements are expected in the early stages. Smaller initial_epsilon promotes faster convergence but might risk stopping the process prematurely if early improvements are substantial. The appropriate value can be determined based on domain knowledge, pilot experiments, or estimations of the adversarial system 110's behavior.

Equation 9 ensures a balance between achieving convergence, reaching performance targets, and maintaining computational efficiency. The dynamic threshold and potential integration of other criteria allow the adversarial system 110 to adapt to different optimization scenarios and user preferences. The explicit definition of stopping criteria provides transparency into the adversarial system 110's decision-making process and allows for adjustments based on specific needs. By implementing a well-defined and adaptable stopping criterion, the adaptive adversarial e-commerce system can effectively optimize storefronts for both user satisfaction and business success while ensuring efficient use of computational resources.

Example pseudocode for using a digital twin to select a storefront for a user is shown below.

```
while True:
  # Get next storefront (either from current set or request new one)
  if storefronts_to_evaluate:
    storefront = storefronts_to_evaluate.pop( )
  else:
    storefront = marketplace.request_new_storefront( )
  # Simulate user interactions and calculate overall score
  digital_twin.interact_with_storefront(storefront)
  S_n = calculate_overall_score(digital_twin.feedback)
  # Update dynamic threshold
  if n > 0:
    ΔS_n = abs(S_n − S_(n−1))
    ε_d = α * ε_(d,n−1) + (1−α) * (ΔS_(n−1) / S_(n−1))
  else:
    ΔS_n = 0
    ε_d = initial_epsilon
  # Check stopping criteria
  if ΔS_n < ε_d * S_n and S_n >= T and n >=N_min:
    break # Stop iterating
  # Store results and prepare for next iteration
  storefront_scores[storefront] = S_n
  n += 1
# Process results and select optimal storefront(s)
optimal_storefronts = select_best_storefronts(storefront_scores)
```

The pseudocode first checks if there are any storefronts remaining in the storefronts_to_evaluate list. If so, it takes the next one for evaluation. Otherwise, it requests a new storefront from the marketplace (which could involve fetching from a database, generating variations, or utilizing other methods). The digital twin 530 interacts with the acquired storefront, and the overall score is calculated based on the collected feedback. If it's not the first iteration, the code calculates the change in score and updates the dynamic threshold ε_d based on the historical relative changes.

The code verifies if all stopping conditions are met: (a) Convergence: The relative change in score is below the dynamic threshold, (b) Performance Target: The score meets or exceeds the predefined target, and (c) Minimum Iterations: A sufficient number of iterations have been performed. If all conditions are true, the loop breaks, ending the iterative process. The storefront and its score are stored for further analysis. The iteration counter n is incremented. After the loop ends, the code selects the best-performing storefront(s) based on the collected scores.

Similar to the adversarial storefront optimization, a stopping criterion for the reinforcement learning (RL) process may be implemented to train and refine the user digital twin 530. The criteria balances the trade-off between model accuracy and training time, considering factors like convergence, performance targets, and computational costs.

The adversarial system 110 will continuously train on new user data, and stop RL training if one or more of the following conditions are met: (1) whether a reward converges, (2) whether a target reward is achieved, (3) whether a maximum of training steps is reached, and or (4) a loss function converges.

The reward convergence condition may be represented by below Equation 10:

$$|R\_n - R\_(n - W)| < \varepsilon\_r \text{ (Reward Convergence)} \quad (10)$$

This condition checks if the average reward obtained by the digital twin 530 has stabilized within a small range over a window of recent episodes. This suggests that the model is no longer learning significantly and further training might not lead to substantial improvements.

The target reward achieved condition may be represented by below Equation 11:

$$R\_n \geq R\_target\ (\text{Target Reward Achieved}) \tag{11}$$

The target reward achieved condition stops the training if the digital twin 530 reaches a predefined target reward, indicating satisfactory performance for the desired tasks.

The maximum training steps condition may be represented by below Equation 12:

$$n \geq N\_max\ (\text{Maximum Training Steps Reached}) \tag{12}$$

The maximum training steps condition sets a limit on the number of training steps to prevent excessive training time and computational costs.

The loss function convergence condition may be represented by below Equation 13:

$$\Delta L\_n < \varepsilon\_l\ (\text{Loss Function Convergence}) \tag{13}$$

In Equation 13, R_n denotes average reward obtained by the digital twin 530 over the last W episodes at training step n, W denotes window size for calculating the moving average reward (e.g., 100 episodes), ε_r denotes threshold for reward convergence, indicating minimal acceptable change in average reward, R_target denotes predefined target reward signifying satisfactory performance of the digital twin 530, N_max denotes maximum number of training steps allowed, ΔL_n denotes absolute change in the loss function value between training steps n and n−1, ε_l denotes threshold for loss function convergence, indicating minimal acceptable change in loss.

The loss function convergence condition monitors the change in the loss function used to train the RL model. If the loss function value stabilizes and shows minimal change, it suggests that the model is converging and further training might not be necessary.

In some embodiments, ε_r and ε_l are chosen based on the scale of rewards and loss values, respectively, and the desired level of precision. Smaller values lead to stricter convergence criteria and potentially longer training times. R_target is chosen to reflect a level of performance that meets the user's needs and aligns with the e-commerce system's objectives. N_max is chosen based on computational resources and the estimated time required for the model to converge. W is chosen to be large enough to smooth out fluctuations but small enough to capture recent performance trends.

In some embodiments, several metrics can be used for R_n, depending on the specific prediction tasks and desired level of detail, including accuracy, precision, recall, F1 score, and area under the ROC curve (AUC-ROC). Accuracy is percentage of correct predictions made by the digital twin 530 (e.g., predicting the next product a user will click on). Precision is proportion of positive predictions that were actually correct (e.g., out of all products predicted to be of interest to the user, how many were truly relevant). Recall is proportion of actual positive cases that were correctly predicted (e.g., out of all products the user was actually interested in, how many were correctly predicted by the digital twin 530). F1-score is harmonic mean of precision and recall, providing a balanced measure of prediction performance. Area Under the ROC Curve (AUC-ROC) measures the model's ability to discriminate between different user behaviors (e.g., purchase vs. no purchase).

The following pseudocode simulates the continuous training of a digital twin 530 using reinforcement learning (RL) with data pulled from a database (e.g., database 640). The training process continues until specific stopping criteria are met, indicating convergence, achievement of performance targets, or exceeding computational limitations.

```
# Initialization
n = 0 # Training step counter
rewards = Queue(max_size=W) # Store rewards for moving average (adjust data
structure as needed)
loss_history = Queue(max_size=2) # Store last two loss values (adjust data structure as
needed)
# Training loop
while True:
  # Pull new data
  data = database.get_next_data( ) # Get next data point (structure depends on database
implementation)
  state = data.state # Extract state from data (adjust attribute name as needed)
  action = data.action # Extract action from data (adjust attribute name as needed)
  # Interact with environment
  next_state, reward, done = environment.step(action) # Adjust function arguments and
return values as needed
  # Update agent and calculate loss
  loss = agent.update(state, action, reward, next_state, done) # Adjust function
arguments as needed
  # Track rewards
  rewards.enqueue(reward) # Add reward to queue (adjust method name as needed)
  R_n = calculate_average(rewards) # Calculate average reward (implement
calculate_average function)
  # Check stopping criteria
  if (
    abs(R_n − (rewards.peek_oldest( ) if rewards.is_full( ) else 0)) < ε_r # Reward
convergence
    or R_n >= R_target # Target reward achieved
```

-continued

```
    or n >= N_max # Maximum training steps reached
    or (loss_history.size( ) == 2 and abs(loss_history.dequeue( ) - loss_history.peek( )) <
ε_1) # Loss convergence
  ):
    break # Stop training
  # Store loss and increment counter
  loss_history.enqueue(loss)
  n +=1
# Training complete
return agent
```

As shown in the pseudocode, the RL includes several stages, e.g., initialization stage, data pulling stage, environment interaction stage, agent update and loss calculation state, reward tracking stage and stop criteria checking stage. During the initialization stage, the function initializes counters, reward queue, and loss history for tracking progress and applying stopping criteria. During the data pulling stage, in each iteration, a new state-action pair is retrieved from the database, simulating the continuous flow of user interaction data. During the environment interaction, the agent (e.g., digital twin) takes the action in the environment (e.g., the simulated e-commerce platform) and observes the resulting next state, reward, and done flag. During the agent update and loss calculation stage, the agent updates its internal parameters based on the experience (state, action, reward, next_state, done) and calculates the loss value associated with the update. During the reward tracking stage, the obtained reward is added to the rewards queue, and the average reward (R_n) is calculated.

During the stopping criteria check stage, the code checks each stopping condition, including a reward convergence condition, a target reward condition, a maximum step condition, and a loss convergence condition. Checking the reward convergence condition includes comparing the current average reward with the oldest reward in the queue to see if the change is within the threshold. Checking the target reward condition includes checking if the average reward has reached the target level. Checking the maximum steps includes verifying if the maximum allowed training steps have been reached, where a training step counter n is incremented each training step is performed. Checking the loss convergence includes determining if there are at least two loss values in the history and checking if the absolute difference between them is below a threshold. If any of these conditions are met, the training loop breaks. After the training loop ends, the trained agent (digital twin) is returned.

Figure 7:
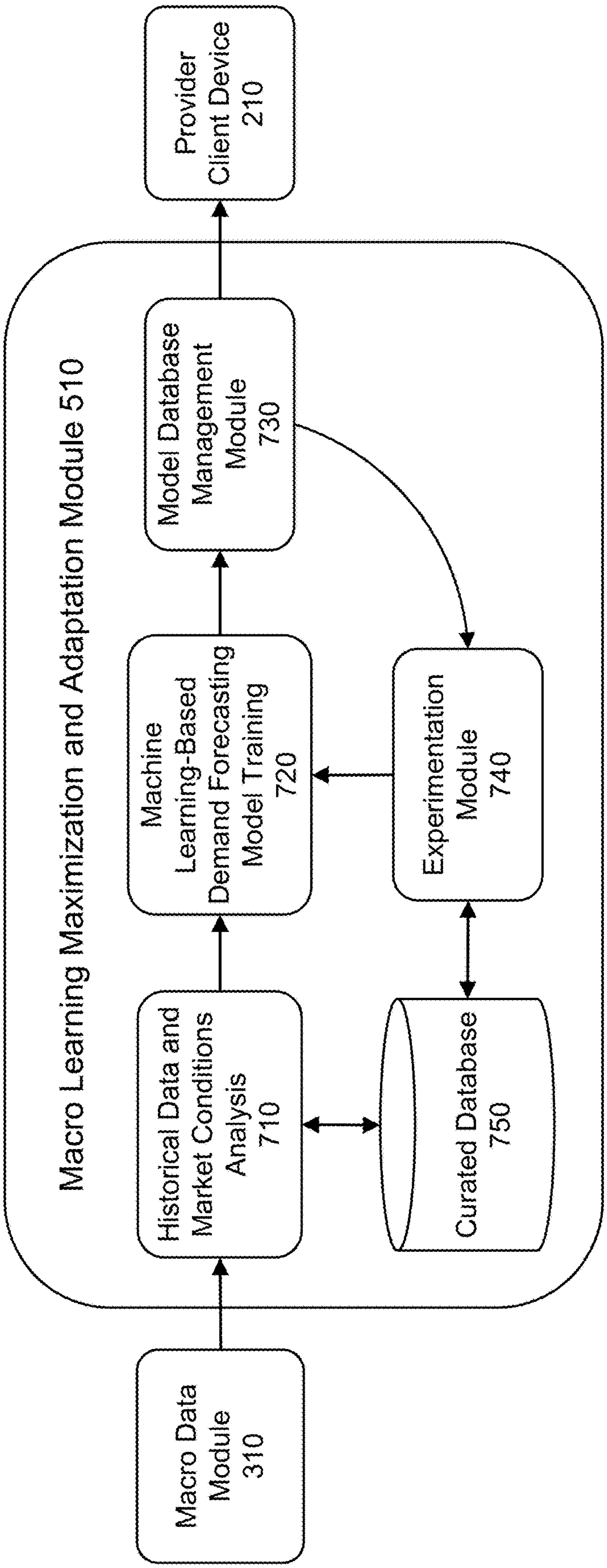
FIG. 7 illustrates an example architecture of macro learning module in accordance with one or more embodiments.

Example Training and Implementing Machine-Learning Models to Determine Product Supply and Demand and Product Placement FIG. 7 illustrates an example architecture of macro learning module 510 in accordance with one or more embodiments, the macro learning module 510 includes a historical and market condition analysis module 710, a demand forecasting model training module 720, a model database management module 730, an experimentation module 740, and a database 750. The database 750 may be a non-relational database configured to store and manage the preprocessed and engineered data from other modules. The database 750 is configured to augment the data from macro data module 320. The model database management module 730 maintains a database of demand forecasting and price optimization models, updates them as new data becomes available, and provides access to demand forecasting module 210, which selects the most suitable models for each product.

The historical and market condition analysis module 710 is configured to analyze historical sales data, market trends, and other relevant factors to understand the dynamics of the marketplace and identify patterns that can inform demand forecasting and price optimization models. The analysis includes steps of data preprocessing, trend analysis, demand forecasting, price optimization, market segmentation, competitor analysis, time series decomposition, automatic alerts, and results storage.

During the step of data preprocessing, historical and market condition analysis module 710 cleans and preprocesses the aggregated sales data, handles missing values, outliers, and inconsistencies, which may be performed via imputation, normalization, and data transformation techniques.

During the step of trend analysis, the historical and market condition analysis module 710 uses time series analysis techniques (e.g., ARIMA, exponential smoothing, prophet) to identify trends and seasonal patterns in the historical sales data. This provides information to understand how the market has behaved in the past and can be used as additional input by demand forecasting models.

During the step of demand forecasting, the historical and market condition analysis module 710 uses machine learning techniques to analyze historical sales and other relevant factors, such as market trends and eternal events (e.g., holidays or special events), to forecast future demand for products. The machine learning techniques include regression models, decision trees, and neural networks, among others.

During the step of price optimization, the historical and market condition analysis module 710 uses machine learning techniques, such as reinforcement learning and decision trees, to optimize prices for products based on demand forecasts and cost data, among other factors. This helps to ensure that prices are set at the optimal level to maximize revenue and profit.

During the step of market segmentation, the historical and market condition analysis module 710 uses clustering algorithms (e.g., K-means, DBSCAN) to group products with similar demand patterns, helping to identify opportunities for targeted marketing and pricing strategies.

During the step of competitor analysis, the historical and market condition analysis module 710 analyzes market trends and competitor pricing strategies to inform pricing and marketing decisions.

During the step of time series decomposition, the historical and market condition analysis module 710 uses seasonal decomposition techniques to identify the various components (trend, seasonal, residual) of the historical sales data, which can inform demand forecasting and price optimization models.

During the step of automatic alerts, the historical and market condition analysis module 710 generates automatic alerts for significant changes in market conditions or potential pricing opportunities based on the results of the analysis. Alerts can be triggered by predefined thresholds or dynamically determined using machine learning techniques such as change point detection. The results of the analysis are stored in database 750 for future use by other modules.

The forecast model training module 720 leverages the analyzed data to train and refine machine learning models for demand forecasting and price optimization, considering factors such as product features, target audience, and seller's optimization strategy. The forecast model training module 720 trains the models using historical sales data, price points, and product features. The models include a demand curve and elasticity of demand model, a product popularity and competitiveness model, and a complementary and substitute products model.

Linear regression, random forest, extreme gradient boosting, and neural networks may be employed to train the demand curve and elasticity of demand model at different price levels based on the input data. The best methods or models are selected and stored in the model database management module 730.

The product popularity and competitiveness module may be trained over historical data augmented with the number of views or clicks in relation to other products in the same category. Several clustering algorithms, including K-means, DBSCAN, Gaussian mixture models, and spectral clustering techniques may be used to group products with similar popularity levels, and the products' relative popularity can be determined within its cluster. The best-performing models are stored in the model database management module 730. Competitiveness is assessed by using machine learning techniques over the historical data, using a mixture of supervised learning methods (support vector machines, CG boosting, decision trees, and logistic regression among others) and unsupervised learning methods (principal component analysis, t-SNE) to identify key product features and aspects that contribute to competitiveness. The best-performing models are stored in the model database management module 730. Forecasted customer ratings are obtained using a hybrid approach, including collaborative filtering algorithms and content-based filtering techniques to improve the accuracy of predictions. These algorithms analyze historical ratings and product features to predict how likely a user is to rate the product positively. The best-performing models are stored in the model database management module 730.

The complementary and substitute products model is trained to identify complementary products. The forecast model training module 720 uses association rule mining techniques, such as the Apriori algorithm and the FP-growth algorithm, to find frequently occurring item sets in historical purchase data. The best-performing models are stored in the database. Substitute products are identified using a mixture of clustering algorithms (e.g., K-means, DBSCAN) and dimensionality reduction techniques (e.g., PCT, t-SNE) applied to product feature data. Products that fall into the same cluster or are close together in the reduced feature space are likely to be substituted, as they share similar characteristics and can satisfy the same customer needs. The best-performing models are stored in the model database management module 730.

The experimentation module 740 is configured to conduct targeted experiments to gather more information and refine the demand forecasting and price optimization models responsive to identify gaps in training data or significant market condition change. The experiments are configured to minimize any negative impact on the overall performance of the adversarial system.

The experimentation module 740 executes the experiments, monitors the results in real-time, and has the ability to terminate the experiment at any moment or request human intervention in case the experiment threatens to affect the current business value or operation of the adversarial system. The experiment results are analyzed to validate the hypothesis and refine the demand forecasting and pricing models accordingly.

In some embodiments, the experimentation module 740 analyzes the historical sales data, market trends, and model performance metrics to identify areas where the data is insufficient or where the model performs poorly. This may be done via a density analysis of the data points in a particular region and anomaly detection algorithms working on the model's error. Each gap is evaluated for the uncertainty it brings to the models and the potential value it can provide to the business. If the uncertainty has a high potential of providing more value to the business above a predefined threshold, the gap is selected for refinement. This threshold considers the cost of refining a gap through experimentation, which must be balanced with the potential benefit. The gap is appraised by testing how metrics such as increased sales or increased margins could be affected according to the missing information. This is performed by simulating what would happen if the prediction from the model for a specific feature were higher or lower, according to the current uncertainty for that gap. Models like Monte Carlo simulations and sensitivity analysis are used to test this.

For the selected gaps or poor model performance, the experimentation module 740 tests a series of hypotheses regarding potential reasons, such as missing data points, unaccounted market factors, or insufficient predictive power of the features. Methods like statistical tests (including t-tests, chi-square tests, and Analysis of Variance (ANOVA) tests), feature importance analysis, and correlation analysis are used to test whether a hypothesis is plausible or not.

Depending on the settled hypothesis, the experimentation module 740 executes a series of predefined experiments to test the hypothesis and gather more information. The experiments are configured to minimize negative impact on the marketplace's overall performance. In some embodiments, the experimentation module 740 performs A/B testing, multivariate testing, or bandit algorithms that change the outcome of the demand forecasting and pricing models for a specific set of products.

Figure 8:
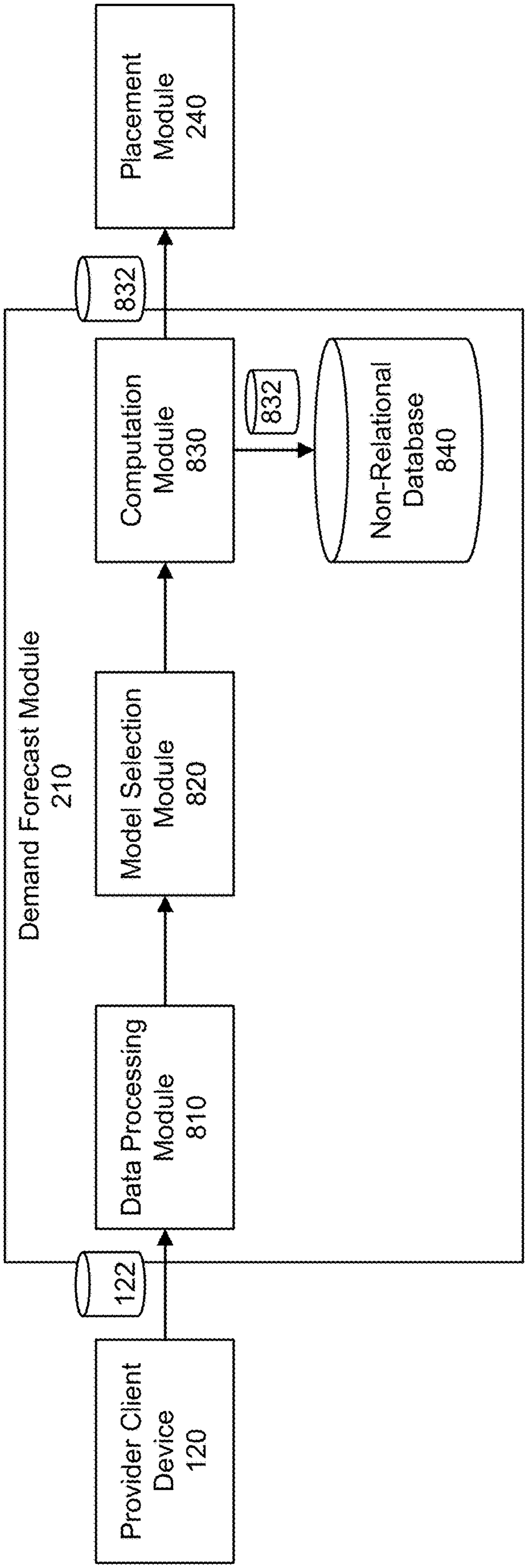
FIG. 8 illustrates an example architecture of a demand forecast module in accordance with one or more embodiments.

FIG. 8 illustrates an example architecture of a demand forecast module 210 in accordance with one or more embodiments. The demand forecast module 210 includes a data processing module 810, a model selection module 820, a computation module 830, and a non-relational database 840.

The data processing module 310 receives product information 122 from a provider client device 120. In some embodiments, the product information 122 is formatted as one or more JavaScript Object Notation (JSON) objects. The data processing module 810 parses and preprocesses and transforms the received information 122 into a suitable format for further analysis and model application. The model selection module 820 is configured to select a most appropriate pre-trained machine learning models from a pool of models. The selection is based on factors related to the product's features, target audience, and the provider's optimization strategy to ensure accuracy and relevance in forecasting and optimization. The computation module 830 applies the selected model to generate a demand curve and elasticity of demand, indicating relationships between product price and quantity demanded. In some embodiments, the computation module 830 may also be configured to determine a product popularity and competitiveness. Alternatively or in addition, the computation module 830 may also be configured to identify complementary and/or substitute products to identify opportunities for product bundling or competition impacts.

In some embodiments, the output 832 of the computation module 830 is stored in the non-relational database 840 for quick retrieval, scalability, and flexibility in data handling. In some embodiments, the non-relational database 840 supports real-time decision-making in subsequent modules. In some embodiments, the output 832 of the computation module 830 is also formatted as one or more JSON objects. The formatted output 832 is then set to the placement module 240 to make informed decisions.

Figure 9:
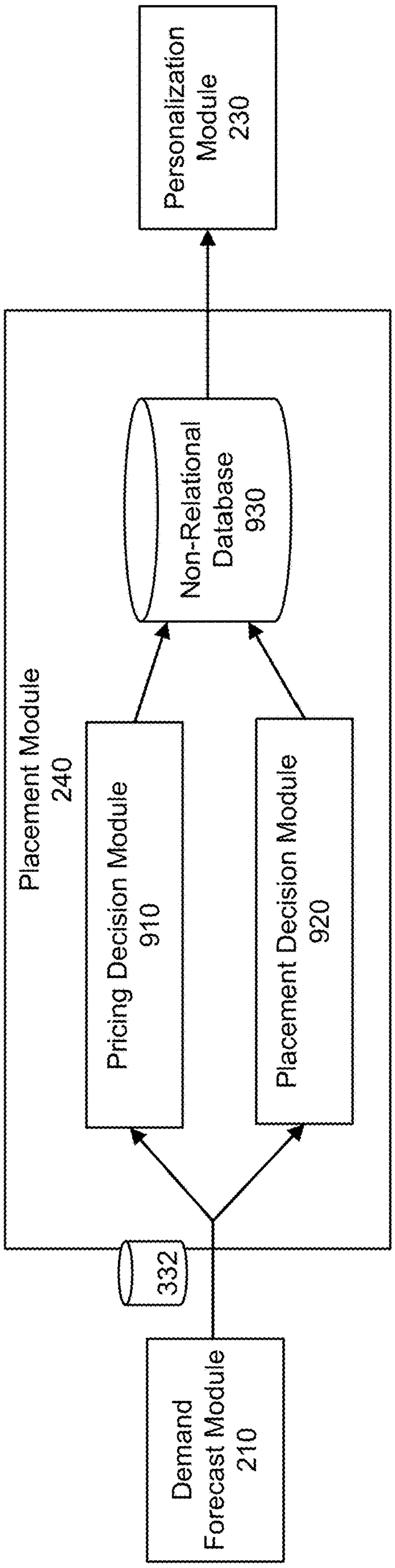
FIG. 9 illustrates an example architecture of the placement module in accordance with one or more embodiments.

FIG. 9 illustrates an example architecture of the placement module 240 in accordance with one or more embodiments. The placement module 240 includes a pricing decision module 910, a placement decision module 920, and a non-relational database 930. The pricing decision module 910 processes the data 332 received from demand forecast module 210 to make informed pricing decisions. The data 332 includes demand curve and elasticity data.

The pricing decision module 910 analyzes the demand curve and elasticity of demand to determine optimal pricing strategies that align with the provider's goals, such as maximizing revenue, adoption, or unit price. The analysis of the demand curve includes analyzing various points on the demand curve to select an optimal price that aligns with the provider's chosen optimization strategy.

Since the demand curve is generally not linear, the pricing decision module 910 may utilize numerical optimization techniques to identify the optimal price for each strategy. This process includes examining various points on the demand curve to determine a price that best aligns with the provider's selected strategy. If the demand curve exhibits relatively simple behavior within a specific price range and does not show significant non-linear characteristics, the module may simplify computation by approximating the demand curve with a linear relationship between price and quantity demanded, represented as:

$$Qd = a - b * P \tag{14}$$

where Qd is a quantity demanded, P is a price, and a and b are constants.

Here are examples of how different points on the demand curve correspond to various strategies.

For a strategy for maximizing total revenue, the pricing decision module 910 identifies a point on the demand curve where a product price multiplied by a quantity demanded maximizes total revenue. If the demand curve can be linearly approximated, total revenue (TR) may be calculated as:

$$TR = P * (a - b * P) \tag{15}$$

where TR is total revenue, P is a price, and a and b are constants derived from the linear approximation. The optimal price to maximize total revenue, P_opt, is found at:

$$\text{P\_opt} = a/(2 * b) \tag{16}$$

where the first derivative of the total revenue function with respect to P is zero, indicating the maximum revenue point.

For a non-linear demand curve, the pricing decision module 910 employs advanced numerical optimization methods, such as golden-section search or gradient-based techniques, using model output from the macro learning module 510 to maximize the revenue function:

$$TR = P * Qd(P) \tag{17}$$

where Qd(P) represents the quantity demanded at price P, as predicted by the model.

For a strategy of maximizing quantity sold, the pricing decision module 910 aims to find a highest quantity demanded on the demand curve while maintaining a price above a breakeven point, thus ensuring profitability while maximizing market penetration. If the demand curve can be approximated linearly, the module calculates the price that results in the maximum quantity demanded above the breakeven point using Equation 14. If the demand curve is non-linear, the pricing decision module 910 conducts a grid search over prices above the breakeven point, utilizing the model output from the macro learning module 510 to find the price yielding the highest quantity demanded.

For a strategy of maximizing unit price, the pricing decision module 910 aims to find a price point on the demand curve where the price is the highest while still maintaining a positive quantity demanded, typically for luxury or niche products where maximizing perceived value is critical. If the demand curve can be approximated linearly, the pricing decision module 910 determines a price that maximizes a unit price while keeping a quantity demanded positive by solving Equation 14. The chosen price is close to where the demand curve meets the vertical axis (Qd=0) but remains above the breakeven point for profitability. For a non-linear demand curve, the pricing decision module 910 employs a range of optimization techniques or a grid search to find a highest price that maintains a positive demand using the macro learning module 510. This strategy may implement initial experiments using an experimentation module to gauge price elasticity at higher ranges.

In some embodiments, the placement decision module 920 uses the demand curve to determine the placement of the product. This includes category placement, promotional placement, and product bundling. The placement decision module 920 assigns the product to appropriate categories or subcategories based on its features and attributes, as well as the current market trends and competition. The placement decision module 920 also identifies suitable promotional opportunities for the product, such as featuring it on a homepage, promoting it in a specific category, or recommending it to a particular user segment. The placement decision module 920 also evaluates potential bundling opportunities with complementary products to enhance the value proposition for the buyers and increase sales.

The output of the pricing decision module 910 and placement decision module 920 is stored in the non-relational database 930 and fed to the personalization module 230. In some embodiments, when the placement module 240 identifies missing or potentially inaccurate information in the data, such as portions of the demand curve that may be unreliable due to insufficient evidence in the training data, it communicates with the readaptation module 220 to conduct targeted experiments. These experiments, configured to not negatively impact an overall performance of the adversarial system, aim to gather information that fills those knowledge gaps and improves the accuracy of the demand curve predictions. By interacting with the readaptation module 220 and the personalized storefront module 230, placement module 240 is able to generate a more fair and responsive marketplace, allowing the adversarial system to continuously adapt to changing market conditions, buyer preferences, and seller strategies while maintaining a balance between the interests of all participants.

In some embodiments, while maximizing trade volume is essential, the adaptive adversarial e-commerce system also monitors and optimizes a broader set of outcome metrics and key performance indicators (KPIs) to ensure overall success and a balanced ecosystem. This includes various user-centric metrics that gauge different aspects of the user experience and provider-centric metrics that gauge different aspects of the provider experience.

User-centric metrics are vital for understanding consumer satisfaction and engagement. These include (but are not limited to) Customer Satisfaction (CSAT), Net Promoter Score (NPS), Customer Retention Rate (CRR), Time to Purchase (TTP), and Average Order Value (AOV). CSAT measures user satisfaction through CSAT surveys, product reviews, and customer support interactions. NPS assesses user loyalty and their likelihood to recommend the platform, gathered through surveys. CRR tracks the percentage of returning users, analyzed through purchase history and engagement patterns. The Conversion Rate measures the percentage of users who complete a desired action such as making a purchase, with data gathered from user behavior and funnel progression. TTP is the average time it takes a user to buy a product or service after first becoming aware of it. TTP and AOV provide insights into purchasing behavior, measured by the time users take to make a purchase and the average amount spent per transaction, respectively.

Provider-centric metrics focus on the platform's providers, assessing their satisfaction and engagement. These metrics include (but are not limited to) provider satisfaction, number of active providers, and provider retention rate. Provider satisfaction may be measured through surveys and feedback mechanisms. The number of active sellers and seller retention rate may be tracked through activity data and product listings, indicating the health of seller engagement on the platform.

Finally, Marketplace Health Metrics like Gross Merchandise Volume (GMV) and Trade Volume provide a macro view of the marketplace's financial health by measuring the total value of goods sold and the number of transactions completed. Inventory Turnover and Product Variety and Availability track how quickly inventory is sold and the diversity and availability of products, helping to understand market dynamics and supply chain efficiency. These metrics are crucial for maintaining a well-rounded view of the marketplace's health and sustainability.

By continuously refining and updating machine learning models, conducting targeted experiments to fill gaps in training data, and managing the model database, the readaptation module 220 ensures that the adaptive adversarial system remains responsive and adaptive to the dynamic behavior of marketplace participants.

The continuous feedback loop created by modules 210-250 in the adaptive adversarial system ensures that the marketplace remains responsive and adaptive to the dynamic behavior of all participants while maintaining a balance between their interests. As the marketplace evolves and the behavior of providers, users, and products change, the continuous feedback loop allows the adversarial system to learn and adapt in real-time.

Figure 10:
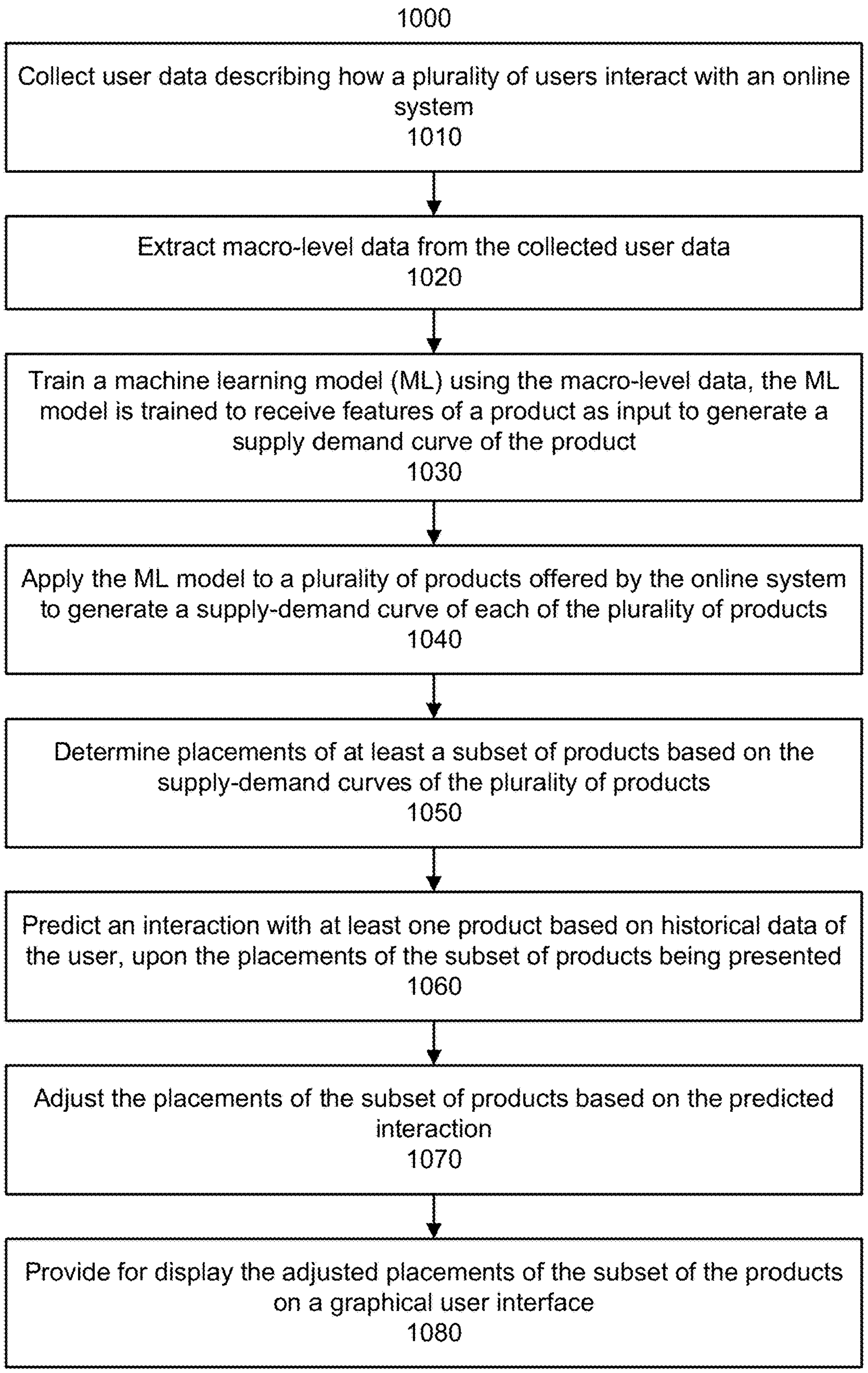
FIG. 10 illustrates a flowchart of one embodiment of a method for using machine learning to generate custom placements of products.

Example Method for Using Machine-Learning to Provide Custom Virtual Environments to Users FIG. 10 is a flowchart of one embodiment of a method 1000 for using machine learning to generate custom placements of products. In various embodiments, the method includes different or additional steps than those described in conjunction with FIG. 10. Further, in some embodiments, the steps of the method may be performed in different orders than the order described in conjunction with FIG. 10. The method described in conjunction with FIG. 10 may be carried out by the adversarial system 110 in various embodiments.

The adversarial system 110 collects 1010 user data describing how a plurality of users interact with an online system. The adversarial system 110 extracts 1020 macro-level data from the collected user data. The macro-level data is associated with overall trends of a plurality of products offered by the online system without specific user behaviors or preferences.

The adversarial system 110 trains 1030 a machine learning model using the macro-level data. The machine learning model is trained to receive features of a product as input to generate a supply-demand curve of the product. The features of the product may include (but are not limited to) historical pricing data of the product, quality or grade of the product, variants (e.g., size, color, models) of the product, availability (e.g., how readily available the product is, including stock levels over time), launch date (time since the product was introduced to the market), historical sales volume, historical promotional impact, seasonality data, and weather data.

The adversarial system 110 applies 1040 the machine learning model to a plurality of products offered by the online system to generate a supply-demand curve for each of the plurality of products. The adversarial system 110 determines 1050 placements of at least a subset of products based on the supply-demand curves of the plurality of products. In some embodiments, the adversarial system 110 also determines 1050 a price for each of the plurality of products based on the supply-demand curves. In some embodiments, the placements and/or prices of the products are determined based on an optimizing strategy that optimizes at least one of a total revenue, a total quantity sold, or a unit price of a product. In some embodiments, a provider of a product is allowed to select one of the optimizing strategies, e.g., a total revenue, a total quantity sold, or a unit price of the product. In some embodiments, a provider is able to select a same or different optimizing strategies for different products they offer.

The adversarial system 110 predicts 1060 an interaction with at least one product based on historical data of a user, upon the placements of the subset of products being presented. The user's interaction with the at least one product may include (but is not limited to) clicking a link associated with the at least one product, hovering over the at least one product, adding the at least one product in a shopping cart, removing the at least one product from the shopping cart, or completing a transaction purchasing the at least one product. In some embodiments, the user interaction is predicted using a digital twin model trained for each user using that user's historical data. In some embodiments, micro-level data for each user is extracted from the collected user data, and a digital twin model is trained for each user using the micro-level data.

The adversarial system 110 adjusts 1070 placements of the subset of products based on the predicted interaction, and provides 1080 for display the adjusted placements of the subset of products on a graphical user interface. In some embodiments, a user interaction score is determined based on the predicted user interaction. Responsive to determining that the user interaction score is lower than a threshold, the adversarial system 110 adjusts the placements. Alternatively, responsive to determining that the user interaction score is lower than a threshold, a new subset of products are selected, and placements of the new subset of products are determined. Based on the placements of the same or different subset of products, a new user interaction score may be determined. In some embodiments, this process repeats as many times as necessary until the user interaction score is greater than the threshold, or when the total number of repeats reaches a preset maximum. After that, the placements of a subset of products corresponding to a high enough user interaction score are presented to the user on a graphical user interface.

Figure 11:
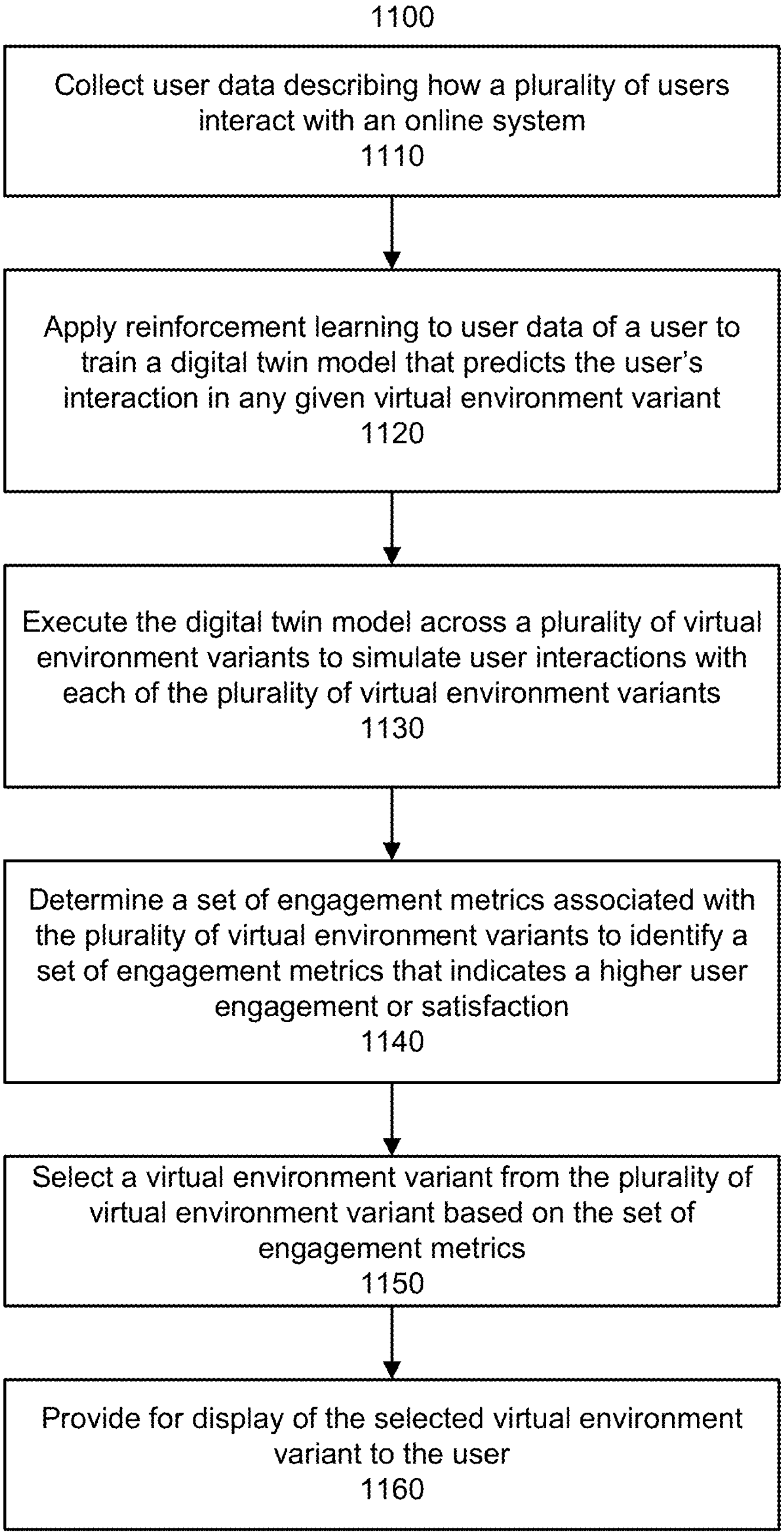
FIG. 11 illustrates a flowchart of one embodiment of a method for using machine learning to provide custom digital environments to users.

FIG. 11 is a flowchart of one embodiment of a method 1100 for using machine learning to provide custom virtual environments to users. In various embodiments, the method includes different or additional steps than those described in conjunction with FIG. 11. Further, in some embodiments, the steps of the method may be performed in different orders than the order described in conjunction with FIG. 11. The method described in conjunction with FIG. 11 may be carried out by the adversarial system 110 in various embodiments.

The adversarial system 110 collects 1110 user data describing how a plurality of users interact with an online system. In some embodiments, a data collection and aggregation module 250 is used to collect user data. In some embodiments, the data collection and aggregation module 250 includes a macro data module 310 configured to collect macro data, and a micro data module 320 configured to collect micro data. In some embodiments, a user interaction data broker 330 is configured to collect user data from each user client device 130 and make the collected user data available to the data collection and aggregation module 250.

The adversarial system 110 applies 1120 reinforcement learning to user data of a user to train a digital twin model that predicts the user's interaction in any given virtual environment variant. In some embodiments, for each user, a digital twin model is trained to predict the corresponding user's interaction. In some embodiments, A/B tests are performed on multiple users. For example, A/B testing may include comparing two or more versions (A and B) of a webpage or application to determine which performs better in achieving a specific goal. Traffic is randomly divided between variations, ensuring that each version is exposed to a similar audience. In some embodiments, multiple virtual storefronts, each with different product placements, layouts, and promotional strategies, act as variations in the A/B testing framework. User behavior and relevant metrics are tracked for each variation to assess their effectiveness. Based on the collected data, the digital twin models are trained to predict users' interactions with various virtual environments.

The adversarial system 110 executes 1130 the digital twin model in a plurality of virtual environment variants to simulate user interactions with each of the plurality of virtual environment variants. In some embodiments, the adversarial system 110 configures the plurality of virtual environment variants, each differing in at least one of layout, product placement, navigational element, or promotional strategy. For example, the adversarial system 110 presents the plurality of virtual environment variants to the digital twin model, and collects the behavior of the digital twin model. User behavior can encompass actions such as clicking, scrolling, hovering over content, adding items to a shopping cart, and completing purchases, among other activities.

In some embodiments, the plurality of virtual environment variants correspond to an online marketplace. The online marketplace presents different products to different users. The placements and prices of the different products are also generated based on machine-learning models. Those machine-learning models are trained over macro data to determine a supply-demand curve for each product. The adversarial system 110 determines a placement and a price for each product based on its corresponding supply-demand curve.

The adversarial system 110 determines 1140 a set of engagement metrics for each of the plurality of virtual environment variants. The set of engagement metrics indicates a user engagement or satisfaction level. In some embodiments, the set of engagement metrics may be determined based on the objectives or goals of the user and/or the product providers. For instance, if a user aims to discover new products, the score might be based on interactions such as clicks, scrolls, and hovering over content. Conversely, if the user's objective is to quickly purchase a specific product, the score could be determined by actions like clicking, adding items to the shopping cart, and making a purchase.

The adversarial system 110 selects 1150 a virtual environment from the plurality of virtual environment variants based on the set of engagement metrics. The adversarial system 110 provides 1160 for display of the selected virtual environment variant to the user. For example, the virtual environment variant corresponding to the best score is selected and provided for display to the user.

The adversarial system 110 collects user's interaction with the selected virtual environment variant and uses the collected data to retrain or refine the digital twin model. As such, the digital twin model is adaptively trained to continuously improve and adapt to the user's most recent behavior. On the other side, the adversarial system 110 can also use the collected data to retrain the supply-demand prediction models to continuously improve those model's accuracy based on the most recent market trends.

Example Computing System

Figure 12:
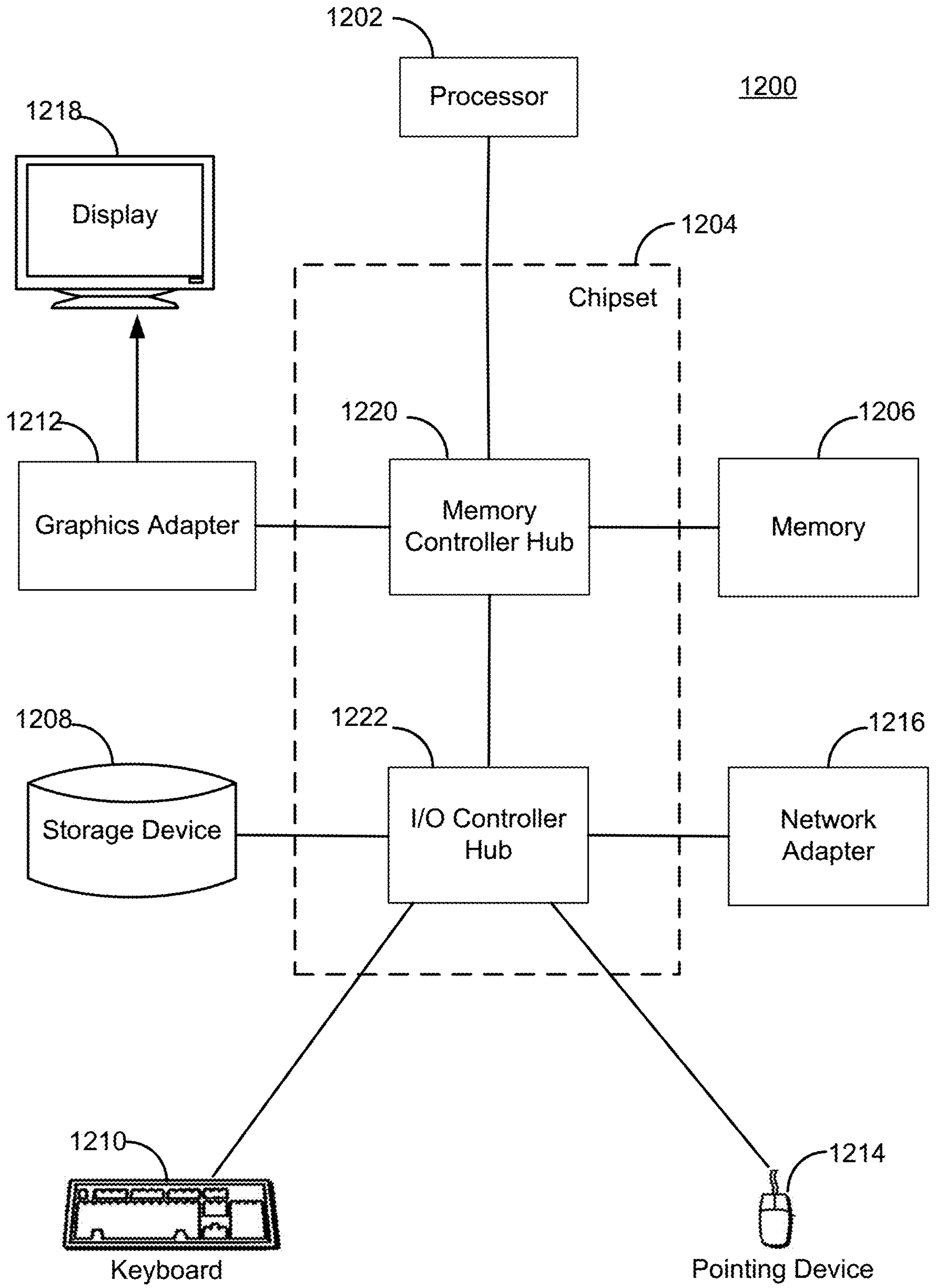
FIG. 12 is a block diagram of an example computer suitable for use in the networked computing environment of FIG. 1.

FIG. 12 is a block diagram of an example computer 1200 suitable for use in the networked computing environment 100 of FIG. 1. The computer 1200 is a computer system and is configured to perform specific functions as described herein. For example, the specific functions corresponding to central database system 110 may be configured through the computer 1200.

The example computer 1200 includes a processor system 1202 having one or more processors 1202. The processing system 1202 may be coupled to a chipset 1204. The chipset 1204 includes a memory controller hub 1220 and an input/output (I/O) controller hub 1222. A memory system having one or more memories 1206 and a graphics adapter 1212 are coupled to the memory controller hub 1220, and a display 1218 is coupled to the graphics adapter 1212. A storage device 1208, keyboard 1210, pointing device 1214, and network adapter 1216 are coupled to the I/O controller hub 1222. Other embodiments of the computer 1200 have different architectures.

In the embodiment shown in FIG. 12, the storage device 1208 is a non-transitory computer-readable storage medium such as a hard drive, compact disk read-only memory (CD-ROM), DVD, or a solid-state memory device. The memory 1206 holds instructions and data used by the processor 1202. The pointing device 1214 is a mouse, track ball, touchscreen, or other types of a pointing device and may be used in combination with the keyboard 1210 (which may be an on-screen keyboard) to input data into the computer 1200. The graphics adapter 1212 displays images and other information on the display 1218. The network adapter 1216 couples the computer 1200 to one or more computer networks, such as network 140.

The types of computers used by adversarial system 110 of FIGS. 1 through 9 can vary depending upon the embodiment and the processing power required by the provider client devices 120, user client devices 130, or the adversarial system 110. For example, the central adversarial system 110 might include multiple blade servers working together to provide the functionality described. Furthermore, the computers can lack some of the components described above, such as keyboards 1210, graphics adapters 1212, and displays 1218.

Additional Considerations

Embodiments described herein use machine learning to adaptively train models that generate custom virtual environments for individual users, personalizing their experience. The models are continuously refined based on recent user data, creating a dynamic system that evolves with ongoing user interactions, ensuring the personalization remains relevant and effective over time. Furthermore, the system trains and stores the machine learning models independently from an online service platform (e.g., a gaming system or a virtual store), such that the platform's performance is not affected by the training and updating of the machine learning models. Nevertheless, the online service platform can still have access and utilize these models to generate custom virtual environments, which improves the efficiency of data handling and provides advanced learning capabilities.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the disclosed subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A method comprising:

collecting user data describing how a user interacts with an online system;

extracting macro-level data from the user data, wherein macro-level data is associated with overall trends of a plurality of products, wherein the plurality of products are offered by the online system;

generating, by a machine learning model, supply-demand curves for the plurality of products from the macro-level data;

identifying, based on the supply-demand curves for the plurality of products, a placement for a product of the plurality of products in a GUI;

generating a digital twin model of the user based on micro-level data of the user data, wherein the digital twin model is trained to mimic user interaction behavior with the online system based on the micro-level data;

responsive to providing the product in the placement to the digital twin model, determining the user interaction behavior with the product based on mimic interaction behavior from the digital twin model;

adjusting the placement of the product in the GUI based on the mimic interaction behavior, wherein adjusting the placement includes updating a weight metric for the product according to the mimic interaction behavior; and providing for display the product in the placement in the GUI according to the weight metric.

2. The method of claim 1, wherein the user interaction behavior comprises at least one of: clicking a link associated with the product, hovering over the product, adding the product in a shopping cart, removing the product from the shopping cart, or competing a purchase transaction purchasing the product.

3. The method of claim 1, wherein the placement is determined based on an optimizing strategy that optimizes at least one of a total revenue, a total quantity sold, or a unit price of a product.

4. The method of claim 3, further comprising:
receiving a user indication from a provider of the product, selecting to be optimized one of: a total revenue, a total quantity sold, or a unit price of a product.

5. The method of claim 1, further comprising:
determining a user interaction score based on the user interaction behavior;
responsive to determining that the user interaction score is lower than a threshold, determining placements of a new subset of products based on the supply-demand curves of the plurality of products;
predicting a user's new interaction with at least one product in the new subset of products;
determining a new user interaction score based on the user's new interaction; and
responsive to determining that the new user interaction score is greater than the threshold, presenting placements of the new subset of products on a graphical user interface to the user.

6. The method of claim 1, further comprising:
determining placements of a plurality of subsets of products on the GUI based on the supply-demand curves of the plurality of products;
predicting a user's interaction over at least one product in each of the plurality of subsets of products;
determining a user interaction score based on the user interaction behavior for each of the plurality of subsets of products;
selecting a placement of a subset of the plurality of subsets of products based on the user interaction score; and
presenting the subset of the plurality of subsets of products according to the placement in the GUI.

7. The method of claim 1, further comprising:
extracting micro-level data from the user data, wherein micro-level data is associated with specific user interactions or preferences of the user;
training a second machine learning model using the micro-level data, the second machine learning model is trained to predict the user interaction behavior with a product presented to the user; and
applying the second machine learning model to the GUI to simulate the user interaction behavior with the GUI.

8. The method of claim 1, further comprising:
collecting additional user data based on user interaction with the GUI; and
retraining the machine learning model based on the user data.

9. A non-transitory computer-readable storage medium comprising stored instructions thereon that, when executed by a processor system, cause the processor system to:
collect user data describing how a user interacts with an online system;
extract macro-level data from the user data, wherein macro-level data is associated with overall trends of a plurality of products, wherein the plurality of products are offered by the online system;
generating, by machine learning model, supply-demand curves for the plurality of products from the macro-level data;
identify, based on the supply-demand curves for the plurality of products, a placement for a product of the plurality of products in a GUI;
generate a digital twin model of the user based on micro-level data of the user data, wherein the digital twin model is trained to mimic user interaction behavior with the online system based on the micro-level data;
responsive to providing the product in the placement to the digital twin model, determine the user interaction behavior with the product based on mimic interaction behavior from the digital twin model;
adjust the placement of the product in the GUI based on the mimic interaction behavior, wherein adjusting the placement includes updating a weight metric for the product according to the mimic interaction behavior; and
provide for display the product in the placement in the GUI according to the weight metric.

10. The non-transitory computer-readable storage medium of claim 9, wherein the user interaction behavior comprises at least one of: a click of a link associated with the product, a hover over the product, an add of the product in a shopping cart, a removal of the product from the shopping cart, or a completion of a purchase transaction purchasing the product.

11. The non-transitory computer-readable storage medium of claim 10, wherein the placement is determined based on an optimizing strategy that optimizes at least one of a total revenue, a total quantity sold, or a unit price of a product.

12. The non-transitory computer-readable storage medium of claim 11, further comprising stored instructions that when executed cause the processor system to:
receive a user indication from a provider of the product, selecting to be optimized one of: a total revenue, a total quantity sold, or a unit price of a product.

13. The non-transitory computer-readable storage medium of claim 9, further comprising stored instructions that when executed cause the processor system to:
determine a user interaction score based on the user interaction behavior;
determine placements of a new subset of products based on the supply-demand curves of the plurality of products if determined that the user interaction score is lower than a threshold;
predict a user's new interaction with at least one product in the new subset of products;
determine a new user interaction score based on the user's new interaction; and
provide for display placements of the new subset of products on a graphical user interface to the user if determined that the new user interaction score is greater than the threshold.

14. The non-transitory computer-readable storage medium of claim 9, further comprising stored instructions that when executed cause the processor system to:
determine placements of a plurality of subsets of products on the GUI based on the supply-demand curves of the plurality of products;
predict a user's interaction over at least one product in each of the plurality of subsets of products;

determine a user interaction score based on the user interaction behavior for each of the plurality of subsets of products;

select a placement of a subset of the plurality of subsets of products based on the user interaction score; and provide for display the subset of the plurality of subsets of products according to the placement in the GUI.

15. The non-transitory computer-readable storage medium of claim 9, further comprising stored instructions that when executed cause the processor system to:

extract micro-level data from the user data, wherein micro-level data is associated with specific user interactions or preferences of the user;

train a second machine learning model using the micro-level data, the second machine learning model is trained to predict the user interaction behavior with a product presented to the user; and apply the second machine learning model to the GUI to simulate the user interaction behavior with the GUI.

16. The non-transitory computer-readable storage medium of claim 9, further comprising stored instructions that when executed cause the processor system to:

collect additional user data based on user interaction with the GUI; and retrain the machine learning model based on the user data.

17. A computing system, comprising a processor system comprised of one or more processors; and a non-transitory computer-readable storage medium comprising stored instructions thereon that, when executed by one or more processors, cause the processor system to:

collect user data describing how a user interacts with an online system;

extract macro-level data from the user data, wherein macro-level data is associated with overall trends of a plurality of products, wherein the plurality of products are offered by the online system;

generate, by a machine learning model, supply-demand curves for the plurality of products from the macro-level data;

identify, based on the supply-demand curves for the plurality of products, a placement for a product of the plurality of products in a GUI;

generate a digital twin model of the user based on micro-level data of the user data, wherein the digital twin model is trained to mimic user interaction behavior with the online system based on the micro-level data;

responsive to providing the product in the placement to the digital twin model, determine the user interaction behavior with the product based on mimic interaction behavior from the digital twin model;

adjust the placement of the product in the GUI based on the mimic interaction behavior, wherein adjusting the placement includes updating a weight metric for the product according to the mimic interaction behavior; and provide for display the product in the placement in the GUI according to the weight metric.

18. The computing system of claim 17, wherein the user interaction behavior comprises at least one of: a click of a link associated with the product, a hover over the product, an add of the product in a shopping cart, a removal the product from the shopping cart, or a completion of a purchase transaction purchasing the product.

19. The computing system of claim 17, wherein the placement is determined based on an optimizing strategy that optimizes at least one of a total revenue, a total quantity sold, or a unit price of a product.

20. The computing system of claim 17, the non-transitory computer-readable storage medium further comprising stored instructions that when executed cause the processor system to:

receive a user indication from a provider of the product, selecting to be optimized one of: a total revenue, a total quantity sold, or a unit price of a product.

* * * * *